US009154267B2

(12) United States Patent
He et al.

(10) Patent No.: US 9,154,267 B2
(45) Date of Patent: Oct. 6, 2015

(54) SOUNDING REFERENCE SIGNAL (SRS) MECHANISM FOR INTRACELL DEVICE-TO-DEVICE (D2D) COMMUNICATION

(71) Applicants: Hong He, Beijing (CN); Seunghee Han, Kyoungkido (KR); Youn Hyoung Heo, Seoul (KR); Jong-Kae Fwu, Sunnyvale, CA (US); Hyung-Nam Choi, Hamburg (DE); Mo-Han Fong, Sunnyvale, CA (US); Yujian Zhang, Beijing (CN); Umesh Phuyal, Hillsboro, OR (US); Rongzhen Yang, Shanghai (CN); Feng Chen, Shanghai (CN); Hujun Yin, Saratoga, CA (US); Xiaogang Chen, Beijing (CN)

(72) Inventors: Hong He, Beijing (CN); Seunghee Han, Kyoungkido (KR); Youn Hyoung Heo, Seoul (KR); Jong-Kae Fwu, Sunnyvale, CA (US); Hyung-Nam Choi, Hamburg (DE); Mo-Han Fong, Sunnyvale, CA (US); Yujian Zhang, Beijing (CN); Umesh Phuyal, Hillsboro, OR (US); Rongzhen Yang, Shanghai (CN); Feng Chen, Shanghai (CN); Hujun Yin, Saratoga, CA (US); Xiaogang Chen, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 25 days.

(21) Appl. No.: 13/734,349

(22) Filed: Jan. 4, 2013

(65) Prior Publication Data

US 2014/0003262 A1 Jan. 2, 2014

Related U.S. Application Data

(60) Provisional application No. 61/667,325, filed on Jul. 2, 2012.

(51) Int. Cl.
*G01R 31/08* (2006.01)
*H04L 1/18* (2006.01)
(Continued)

(52) U.S. Cl.
CPC ............ *H04L 1/1861* (2013.01); *H04L 1/1812* (2013.01); *H04L 5/0053* (2013.01);
(Continued)

(58) Field of Classification Search
CPC ..... H04L 1/1861; H04L 1/1812; H04L 5/005; H04L 5/053; H04L 5/073; H04L 5/14; H04W 28/08; H04W 24/10; H04W 72/0446; H04W 72/042; H04W 52/206; H04W 52/0212; H04W 72/005; H04W 92/02; H04W 4/005; H04W 36/22; H04W 52/0245; H04W 48/12; H04W 68/00; H04W 72/046; H04W 72/0413; Y02B 60/50
See application file for complete search history.

(56) References Cited

U.S. PATENT DOCUMENTS 8,270,908 B2 * 9/2012 Wang et al. ...................... 455/69
8,504,052 B2 * 8/2013 Hakola et al. ............... 455/452.1
(Continued)

OTHER PUBLICATIONS

Lei, et al., "Operator Controlled Device-to-Device Communications in LTE-Advanced Networks", IEEE Wireless Communications, University Of Waterloo, Jun. 2012, pp. 96-104.
(Continued)

*Primary Examiner* — Robert Wilson
(74) *Attorney, Agent, or Firm* — Thorpe North & Western LLP

(57) ABSTRACT

Technology for device discovery using a device-to-device (D2D) sounding reference signal (SRS) and device discovery using D2D SRS in a channel measurement group (CMG) is disclosed. In an example, a user equipment (UE) configured for device discovery via a node using the D2D SRS can include a transceiver module. The transceiver module can send a radio resource control (RRC) device discovery request to a node, scan D2D SRS subframes of proximity UEs using D2D SRS triggering, and send feedback to the node of detected D2D SRS information of the proximity UEs. The proximity UE can be located within a same cell as the UE.

41 Claims, 25 Drawing Sheets

(51) Int. Cl.
   *H04W 28/08* (2009.01)
   *H04W 24/10* (2009.01)
   *H04W 72/04* (2009.01)
   *H04W 52/02* (2009.01)
   *H04W 72/00* (2009.01)
   *H04W 92/02* (2009.01)
   *H04L 5/00* (2006.01)
   *H04W 4/00* (2009.01)
   *H04W 36/22* (2009.01)
   *H04L 5/14* (2006.01)
   *H04W 48/12* (2009.01)
   *H04W 68/00* (2009.01)
   *H04W 88/08* (2009.01)

(52) U.S. Cl.
   CPC ............ *H04L5/0055* (2013.01); *H04L 5/0073* (2013.01); *H04L 5/14* (2013.01); *H04W 4/005* (2013.01); *H04W 24/10* (2013.01); *H04W 28/08* (2013.01); *H04W 36/22* (2013.01); *H04W 48/12* (2013.01); *H04W 52/0206* (2013.01); *H04W 52/0212* (2013.01); *H04W 52/0245* (2013.01); *H04W 68/00* (2013.01); *H04W 72/005* (2013.01); *H04W 72/042* (2013.01); *H04W 72/046* (2013.01); *H04W 72/0413* (2013.01); *H04W 72/0446* (2013.01); *H04W 92/02* (2013.01); *H04W 88/08* (2013.01); *Y02B 60/50* (2013.01); *Y02E 40/62* (2013.01)

(56) References Cited

U.S. PATENT DOCUMENTS

| | | | |
|---|---|---|---|
| 8,509,105 B2* | 8/2013 | Kneckt et al. | 370/252 |
| 2010/0159935 A1 | 6/2010 | Cai et al. | |
| 2011/0275382 A1* | 11/2011 | Hakola et al. | 455/452.2 |
| 2012/0290650 A1* | 11/2012 | Montuno et al. | 709/204 |
| 2013/0051277 A1* | 2/2013 | Hakola et al. | 370/254 |
| 2013/0083779 A1* | 4/2013 | Ahn et al. | 370/336 |
| 2013/0109301 A1* | 5/2013 | Hakola et al. | 455/39 |
| 2013/0148526 A1* | 6/2013 | Hwang et al. | 370/252 |
| 2013/0148566 A1* | 6/2013 | Doppler et al. | 370/312 |
| 2013/0272196 A1* | 10/2013 | Li et al. | 370/328 |
| 2013/0322276 A1* | 12/2013 | Pelletier et al. | 370/252 |
| 2014/0003262 A1* | 1/2014 | He et al. | 370/252 |
| 2014/0056220 A1* | 2/2014 | Poitau et al. | 370/328 |
| 2014/0064263 A1* | 3/2014 | Cheng et al. | 370/350 |
| 2014/0112194 A1* | 4/2014 | Novlan et al. | 370/254 |
| 2014/0127991 A1* | 5/2014 | Lim et al. | 455/39 |

OTHER PUBLICATIONS

International Search Report and Written Opinion Received for PCT Patent Application No. PCT/US2013/048018 mailed on Sep. 30, 2013, 11 Pages.

* cited by examiner

```
D2D-SoundingRS-UL-ConfigCommon ::=      CHOICE {
    release                                 NULL,
    setup                                   SEQUENCE {
        srs-BandwidthConfig                     ENUMERATED {x,y,z,... },
        srs-Bandwidth                           ENUMERATED {a,b,c,...}
        srs-SubframeConfig                      ENUMERATED {d,e,f,...}
        transmissionComb                        INTEGER (0..2),
        cyclicShiftConfig                       xxxx
        srs-PowerConfig                         xxxx                    OPTIONAL -- Need ON
    }
}
```

FIG. 7

```
D2D-SoundingRS-UL-ConfigDedicated-r12 ::= CHOICE{
    release                             NULL,
    setup                               SEQUENCE {
        freqDomainPosition                  INTEGER (0..x),
        srs-ConfigIndex                     INTEGER (0..y),
        transmissionComb                    INTEGER (0..1),
        cyclicShift                         ENUMERATED {cs0, cs1, cs2, cs3, cs4, cs5, cs6, cs7}
        srs-Muting-ConfigIndex              INTEGER(0..z)

}
}

D2D-SoundingRS-UL-ConfigDedicatedAperiodic-r12 ::=CHOICE{
    freqDomainPosition              INTEGER (0..x),
    srs-ConfigIndex                 INTEGER (0..y),
    transmissionComb                INTEGER (0..1),
    cyclicShift                     ENUMERATED {cs0, cs1, cs2, cs3, cs4, cs5, cs6, cs7}
    D-RNTI                          D-RNTI
    Group-Index                     INTEGER(0..z)
}
```

FIG. 8

```
-- ASN1START

SRSDetectedReport ::=              SEQUENCE {
    srsDetectedList                SRSDetectedList         OPTIONAL,
}

SRSDetectedList ::=                SEQUENCE (SIZE (1..SRSDetected)) OF DetectedSRS DetectedSRS ::= SEQUENCE{
    freqDomainPosition             INTEGER (0..x),
    timeDomainPosition             INTEGER (0..y),
    cyclicShift                    ENUMERATED {cs0, cs1, cs2, cs3, cs4, cs5, cs6, cs7}
    CombIndex                      INTEGER (0..1),
}
-- ASN1STOP
```

FIG. 9

```
D2D-Detectable-SoundingRS-UL-ConfigDedicated-r12 ::=   CHOICE{
    release                        NULL,
    setup                          SEQUENCE {
        freqDomainPosition             INTEGER (0..x),
        srs-ConfigIndex                INTEGER (0..y),
        transmissionComb               INTEGER (0..1),
        cyclicShift                    ENUMERATED {cs0, cs1, cs2, cs3, cs4, cs5, cs6, cs7}
    }
}
```

FIG. 10

```
D2D-Detectable-SoundingRS-UL-ConfigDedicatedList ::=
        SEQUENCE (SIZE (1..maxDetSRS)) OF D2D-Detectable-SoundingRS-UL-ConfigDedicated D2D-Detectable-SoundingRS-UL-ConfigDedicated::=    SEQUENCE{
        detectableSRSIndex          INTEGER (0.. maxDetSRS-1)
        srs-Bandwidth               ENUMERATED {bw0, bw1, bw2, bw3},
        srs-HoppingBandwidth        ENUMERATED {hbw0, hbw1, hbw2, hbw3},
        freqDomainPosition          INTEGER (0..23),
        srs-ConfigIndex             INTEGER (0..1023),
        transmissionComb            INTEGER (0..1),
        cyclicShift                 ENUMERATED {cs0, cs1, cs2, cs3, cs4, cs5, cs6, cs7}
}
```

FIG. 11

```
-- ASN1START

SRSDetectedReport ::=       SEQUENCE {
     srsDetectedList            SRSDetectedList              OPTIONAL,
}

SRSDetectedList ::=         SEQUENCE (SIZE (1..SRSDetected)) OF DetectedSRS

DetectedSRS ::= SEQUENCE{
     detectableSRSIndex         INTEGER (0.. maxDetSRS-1)
}
-- ASN1STOP
```

FIG. 12

```
NewCMGInitialRequest ::= SEQUENCE{
        cmgID                    BIT STRING (SIZE (16)),
        cmgReponseDurationTimer          ENUMERATED {
                                     psf20, psf30, psf40, psf50,
                                     psf60, psf80, psf100, psf200},
        ...
}
```

FIG. 21

```
NewCMGInitialResponse ::= SEQUENCE{
        cmgID                    BIT STRING (SIZE (16)),
        cmgExecutionAllowed              BOOLEAN,
        ...
}
```

FIG. 22

```
CMGConfigUpdate ::= SEQUENCE{
        cmgID                    BIT STRING (SIZE (16)),
        CMGConfig             SEQUENCE {
            Release            NULL,
            Setup              SEQUENCE {
                monitoringUeInfoList     SEQUENCE (SIZE (1..maxUeNumber)) OF
MonitoringUeInfo,
                measurementReportInterval    ENUMERATED {
                                     sf10, sf20, sf32, sf40, sf64, sf80,
                                     sf128, sf160, sf320, sf640, spare6,
                                     spare5, spare4, spare3, spare2,
                                     spare1  },
                measurementReportType        ENUMERATED { RSRP, RSRQ, spare6,
                                     spare5, spare4, spare3, spare2,
                                     spare1  },
                ...
            }
        }
}

MonitoringUeInfo       ::= SEQUENCE{
        uescheduledC-RNTI        C-RNTI,
        uePhysicalConfigDedicated        PhysicalConfigDedicated,
        ...
} maxUeNumber              INTEGER ::= 32
```

FIG. 23

```
CMGJoinRequest ::= SEQUENCE{
    cmgID                       BIT STRING (SIZE (16)),
    cmgReponseDurationTimer         ENUMERATED {
                                        psf20, psf30, psf40, psf50,
                                        psf60, psf80, psf100, psf200},
    cmgUeCount                  INTEGER (1..32),
        ...
}
```

FIG. 25

```
CMGRemoveRequest ::= SEQUENCE{
    cmgID                       BIT STRING (SIZE (16)),
    cmgReponseDurationTimer         ENUMERATED {
                                        psf20, psf30, psf40, psf50,
                                        psf60, psf80, psf100, psf200},
        ...
}
```

FIG. 27

```
CMGRemoveResponse ::= SEQUENCE{
    cmgID                       BIT STRING (SIZE (16)),
        ...
}
```

FIG. 28

```
D2D-MeasReport ::=          SEQUENCE {
    cmgID                       BIT STRING (SIZE (16)),
    srsMeasResults              SEQUENCE (SIZE (1..maxMeasNumber)) OF
SRSmeasResult,
    ueTransPower                INTEGER (-40..23)
}

SRSmeasResult    ::=        SEQUENCE{
    srsTransUE                  C-RNTI,
    rsrpResult                  INTEGER(0..108),        OPTIONAL
    rsrqResult                  INTEGER(0..67)          OPTIONAL
}
```

FIG. 31

SOUNDING REFERENCE SIGNAL (SRS) MECHANISM FOR INTRACELL DEVICE-TO-DEVICE (D2D) COMMUNICATION

RELATED APPLICATIONS

This application claims the benefit of and hereby incorporates by reference U.S. Provisional Patent Application Ser. No. 61/667,325, filed Jul. 2, 2012.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

Wireless mobile communication technology can also include device-to-device (D2D) communication where two wireless devices (e.g., UEs) can communicate directly with each other without a node. In some configurations, the wireless devices may include a radio to communicate with the node and a radio to communicate directly with another wireless device. In other configurations, wireless devices with a single radio may also communicate with the node and the other wireless devices at different time intervals.

D2D communication and communication between a node and a wireless device can use time-division duplexing (TDD) or frequency-division duplexing (FDD) for DL or UL transmissions. Time-division duplexing (TDD) is an application of time-division multiplexing (TDM) to separate downlink and uplink signals (or separate signals to a UE or from the UE in D2D communication). In TDD, downlink signals and uplink signals may be carried on a same carrier frequency (i.e., shared carrier frequency) where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as subchannels in one communication channel, but are physically transmitted on different resources. In frequency-division duplexing (FDD), an uplink transmission and a downlink transmission (or a transmission to and from a UE in D2D communication) can operate using different frequency carriers (i.e. separate carrier frequency for each transmission direction). In FDD, interference can be avoided because the downlink signals use a different frequency carrier from the uplink signals.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 7 illustrates a diagram of a radio resource control (RRC) information element (IE) D2D-SoundingRS-UL-ConfigCommon in accordance with an example;

FIG. 8 illustrates a diagram of a radio resource control (RRC) information element (IE) D2D-SoundingRS-UL-ConfigDedicated-r12 and D2D-SoundingRS-UL-ConfigDedicatedAperiodic-r12 in accordance with an example;

FIG. 9 illustrates an example abstract syntax notation one (ASN.1) code for a feedback information element (IE) SRS-DetectedReport in accordance with an example;

FIG. 10 illustrates a diagram of a radio resource control (RRC) information element (IE) D2D-SoundingRS-UL-ConfigDedicatedAperiodic-r12 in accordance with an example;

FIG. 11 illustrates a diagram of a radio resource control (RRC) information element (IE) D2D-Detectable-SoundingRS-UL-ConfigDedicatedList in accordance with an example;

FIG. 12 illustrates an example abstract syntax notation one (ASN.1) code for a feedback information element (IE) SRS-DetectedReport in accordance with an example;

FIG. 21 illustrates a diagram of a radio resource control (RRC) information element (IE) NewCMGInitialRequest in accordance with an example;

FIG. 22 illustrates a diagram of a radio resource control (RRC) information element (IE) NewCMGInitialResponse in accordance with an example;

FIG. 23 illustrates a diagram of a radio resource control (RRC) information element (IE) CMGConfigUpdate in accordance with an example;

FIG. 25 illustrates a diagram of a radio resource control (RRC) information element (IE) CMGJoinRequest in accordance with an example;

FIG. 27 illustrates a diagram of a radio resource control (RRC) information element (IE) CMGRemovingRequest in accordance with an example;

FIG. 28 illustrates a diagram of a radio resource control (RRC) information element (IE) CMGRemoveResponse in accordance with an example;

FIG. 31 illustrates a diagram of a radio resource control (RRC) message for received sounding reference signal (SRS) signal strength reporting in accordance with an example.

Figure 1:
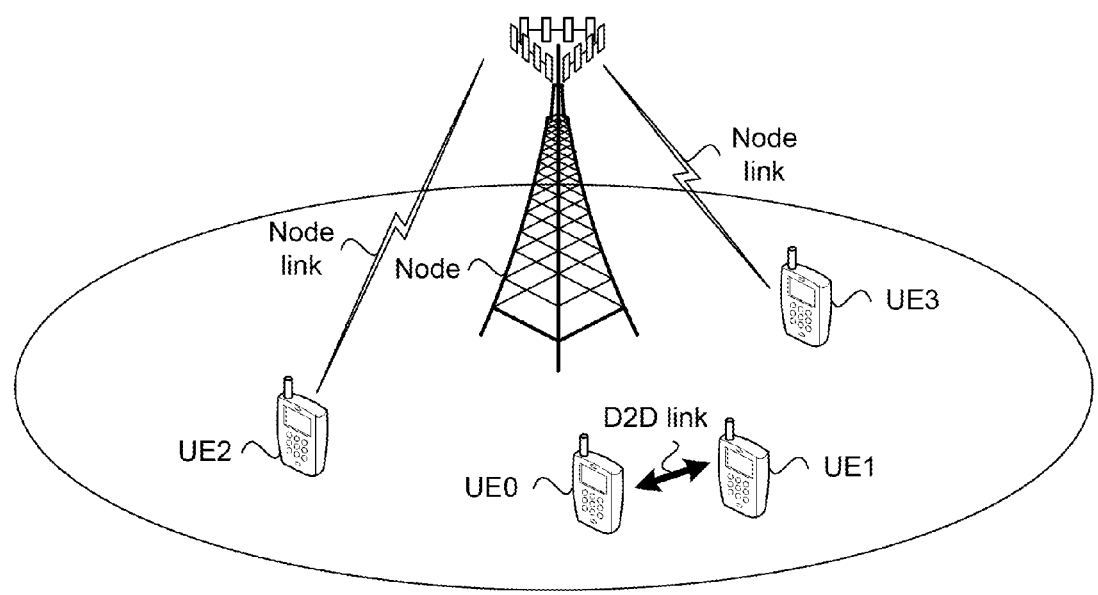
FIG. 1 illustrates a diagram of device-to-device (D2D) communication between wireless devices (e.g., UEs) as an underlay to a cellular network in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

With the proliferation of wireless devices equipped with one or more cellular modem(s), long term evolution (LTE) direct communication can be a feature that can significantly enhance and complement the performance of LTE technology. Furthermore proximity-based applications and services represent an enormous social-technological trend. An LTE direct communication capability, such as device-to-device (D2D) communication, can use LTE protocols for proximity-based applications and services. Additionally, direct device-to-device (D2D) communications can be important to public safety first responders, as well as for offloading a traffic load of cellular network in some cases.

In an example, the D2D communication underlaying a 3GPP LTE-Advanced cellular network can enable local services with limited interference impact on a primary cellular network. FIG. 1 illustrates user equipments (UEs) UE2 and UE3 communicating via a node link (e.g., uplink and downlink transmissions) with a node and UE0 and UE1 using D2D communication (e.g., D2D link) as an underlay to a cellular network.

An overall D2D communication procedure can be divided into at least two basic stages: Proximity-based device discovery and subsequent D2D communication. Some principles to consider for a device discovery method can include: Controlled interference to and from legacy UEs to assure a device discovery accuracy; minimal to no device discovery signaling collision to enable device discovery in a timely manner; and scalability for device discovery signal resources allocation according to the number of D2D UEs (i.e., ability to handle few or large numbers of D2D UEs).

Device discovery signal resources allocation and high-layer signaling procedure can be designed and defined considering the device discovery principles to enable D2D communication in an efficient way.

A sounding reference signal-aided (SRS-aided) device discovery method can be used to enable D2D communication taking into account factors such as backward compatibility with frequency-hopping SRS from legacy UEs and potential intra-cell physical uplink shared channel (PUSCH) interference without coordination. Sounding reference signals can include reference signals transmitted in an uplink (UL) transmission to enable the node to perform channel sounding, which can be used to support frequency-domain scheduling. The Physical Uplink Shared CHannel (PUSCH) can be an uplink physical channel carrying scheduled data traffic and possible control signaling. The PUSCH can be carried in subframes of a radio frame.

Figure 2A:
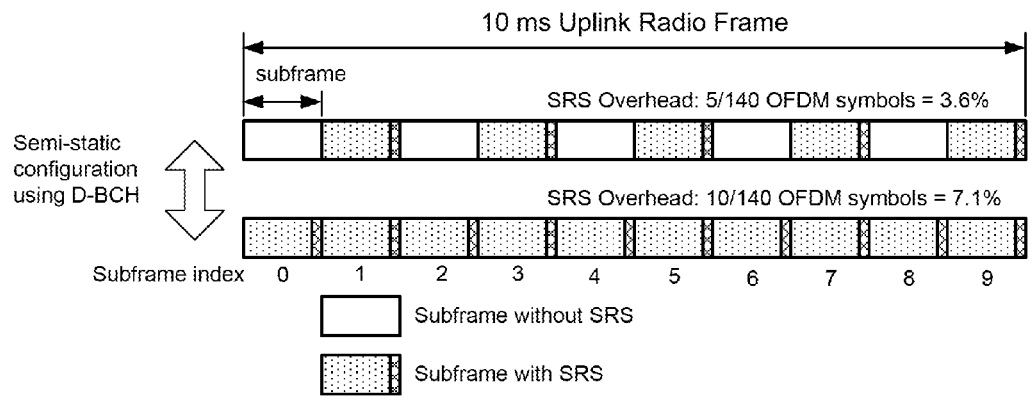
FIG. 2A illustrates a diagram of sounding reference signal (SRS) uplink subframe in a time domain in accordance with an example.

FIG. 2A illustrates various sounding reference signal (SRS) uplink subframe configurations within uplink radio frame (e.g., 10 milliseconds [ms]). Each subframe can have a 1 ms time duration. The SRS configuration can be updated semi-statically via the dynamic-broadcast control channel (D-BCH). The broadcast control channel (BCH) can have a fixed pre-defined transport format and can be broadcasted over the entire coverage area of the cell. In LTE, the broadcast channel can be used to transmit the system information field necessary for system access. Due to the relatively large size of the system information field, the BCH can be divided into two portions: primary (P-BCH) and dynamic (D-BCH). The P-BCH can contain basic layer 1 (physical layer) and/or layer 2 (L1/L2) system parameters used to demodulate the D-BCH which contains the remaining system information field.

In the time domain, the SRS can occupy the last orthogonal frequency-division multiplexing (OFDM) symbol of a SRS uplink subframe. Each subframe in the radio frame can have a subframe index (e.g., 0-9). Each subframe can include either 12 or 14 OFDM symbols on the time axis. Uplink subframes can include a SRS or may not include a SRS. The signaling overhead due to SRS when half of the subframes (assuming 14 OFDM symbols per subframe) in a radio frame including the SRS can be 3.6% (i.e., 5/140 OFDM symbols) of the total uplink transmission bandwidth. The signaling overhead due to SRS when all of the subframes (assuming 14 OFDM symbols per subframe) in a radio frame including the SRS can be 7.1% (i.e., 10/140 OFDM symbols) of the total uplink transmission bandwidth. In the frequency domain, the minimum SRS bandwidth in the LTE system can be four physical resource blocks (PRBs).

Device discovery can modify legacy signals typically used for uplink and downlink communication between the node and wireless device and modify the signaling procedure to include signaling to proximity wireless devices within a specified proximity of the wireless device. For example, a device discovery can be divided into at least two dependent parts: Discovery signal design (part 1) and device discovery signaling procedures (part 2).

Discovery Signal Design

Resources allocation (RA) for D2D SRS used in discovery signaling (part 1) can include a cell-specific D2D SRS configuration, a UE-specific D2D SRS configuration, aperiodic D2D SRS (e.g., LTE type-1 D2D SRS) triggering, and UE feedback.

Cell-Specific D2D SRS Configuration

Figure 2B:
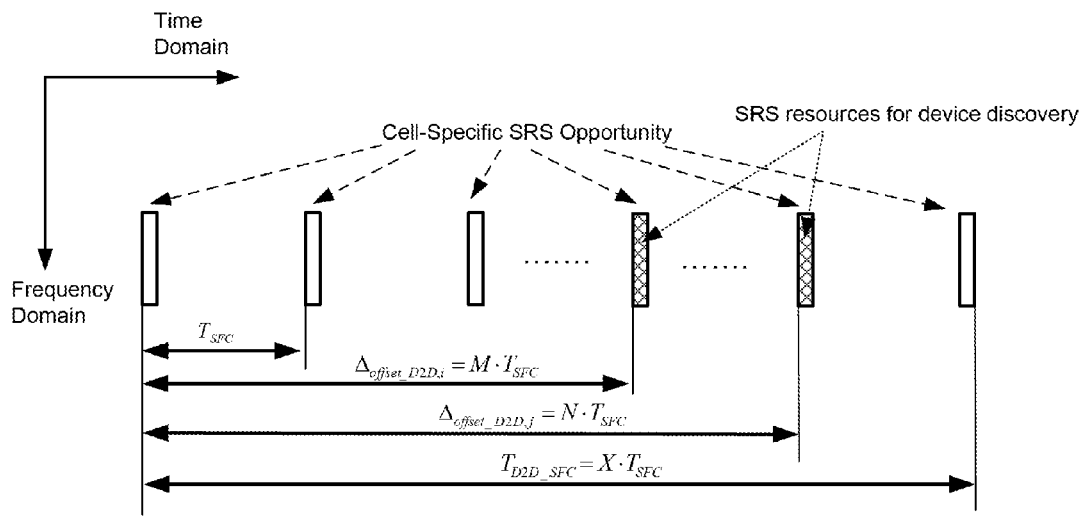
FIG. 2B illustrates a diagram of periodicity of cell-specific device-to-device (D2D) sounding reference signal (SRS) configuration in accordance with an example.

FIG. 2B illustrates a periodicity of a cell-specific D2D SRS configuration in the time domain. Periodicity can describe the recurrence at regular intervals of various types of signaling, such as a SRS transmission. The D2D SRS resources can correspond to an SRS opportunity belonging to the cell-specific SRS resources, which can be indicated through a system information block type 2 (SIB2) to avoid intra-cell inter-node PUSCH interference. Furthermore, frequency-hopping functionality may not be used for D2D SRS. Frequency hopping can be a method of transmitting radio signals by rapidly switching a carrier among many frequency channels using a pseudorandom sequence or specified sequence known to both a transmitter (e.g., UE in an uplink) and a receiver (e.g., eNB in the uplink). Frequency hopping can enable the UE to exploit the frequency diversity of a wideband channel used in LTE in an uplink while keeping a contiguous allocation (in the time domain).

The periodicity and index of cell-specific subframes for D2D SRS can be deduced using parameters $T_{SFC}$, $T_{D2D\_SFC}$, and $\Delta_{offset\_D2D}$. $T_{SFC}$ is the cell-specific subframe configuration period and signaled in the SIB2 message. $T_{D2D\_SFC}$ is a cell-specific parameter restricted to integer multiples (e.g., X) of $T_{SFC}$ to avoid the PUSCH interference. $\Delta_{offset\_D2D}$ is the cell-specific subframe offset for the transmission of D2D SRS. The $\Delta_{offset\_D2D}$ can also be expressed as integer multiples (e.g., M or N) of $T_{SFC}$, which can determine the subframes in which D2D SRS are transmitted by UEs. The integers "i" and "j" in FIG. 2B are two indices of subframes generally used to show two cell-specific D2D SRS resources location in time domain.

Figure 6:
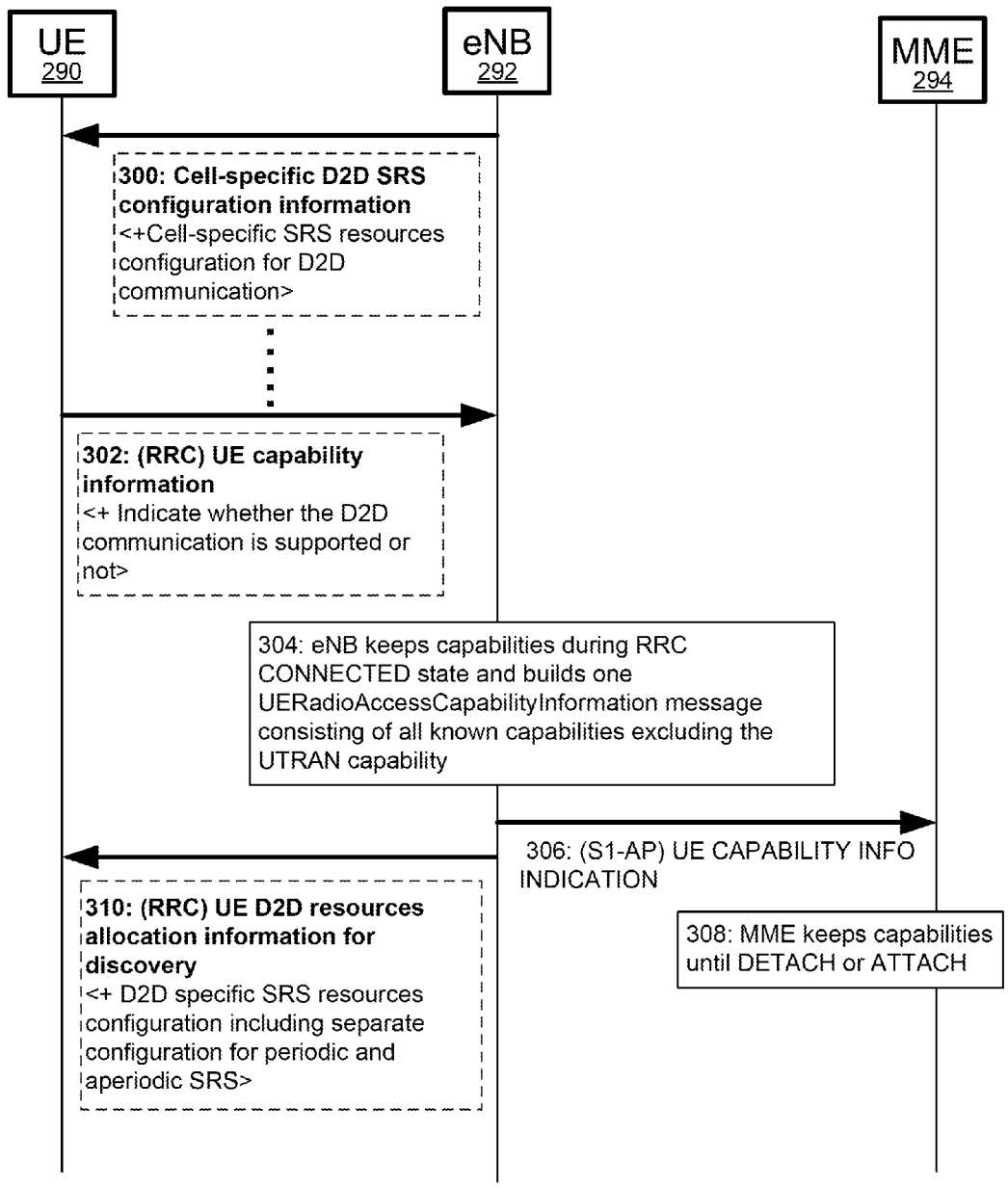
FIG. 6 illustrates an example process for device-to-device (D2D) specific resources allocation (RA) in accordance with an example.

Cell-specific D2D SRS configurations can be transmitted via broadcasting system information, such as SIB2 or a handover message as a separate information element such as D2D-SoundingRS-UL-ConfigCommon (shown in FIG. 6). In particular, parameters $T_{D2D\_SFC}$ and $\Delta_{offset\_D2D}$ can be jointly coded and subsequently signaled through a single parameter in radio resource control (RRC) signal. Broadcasting the cell-specific D2D SRS configuration can reduce power consumption of D2D UEs by reducing the number of SRS signals to scan and/or detect, since the D2D UEs can scan and/or detect and attempt to blindly decode the D2D SRS signal on all possible D2D SRS opportunities. By setting an upper limit on the D2D SRS subframes, UEs can detect a limited number of subframe for device discovery.

Figure 3A:
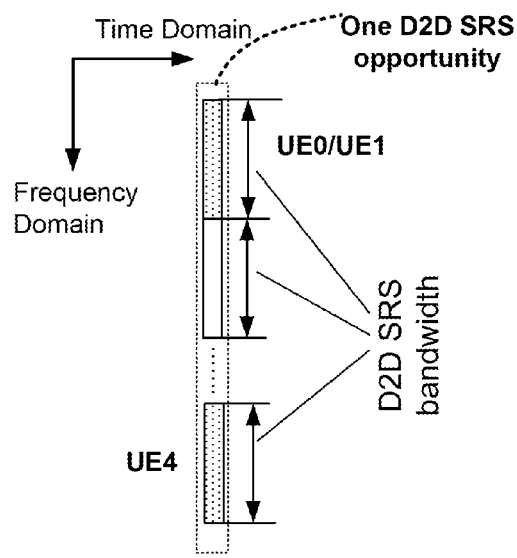
FIG. 3A illustrates a diagram of parallel transmissions of device-to-device (D2D) sounding reference signal (SRS) in accordance with an example.
Figure 3B:
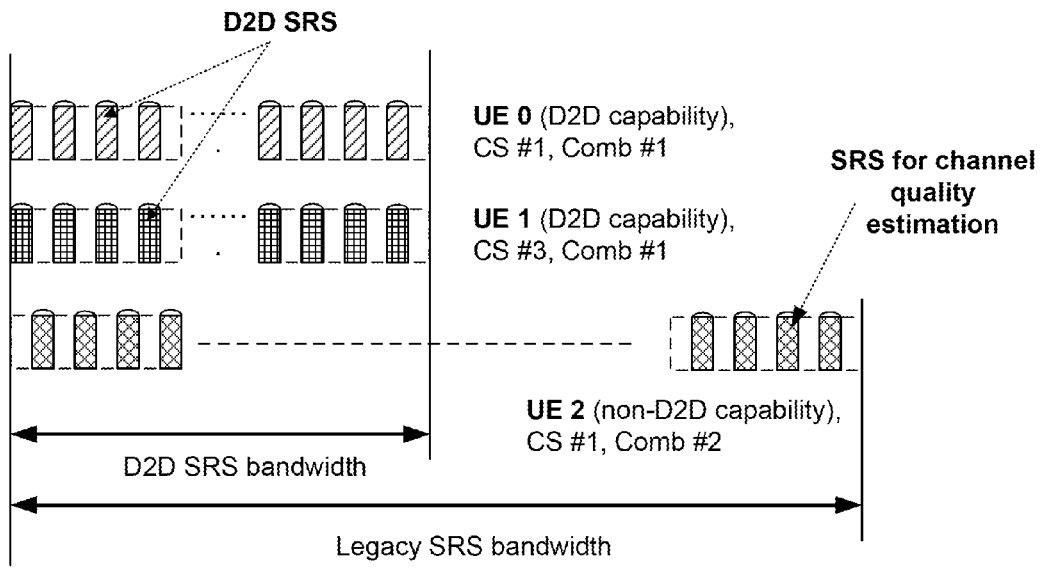
FIG. 3B illustrates a diagram of multiplexing of a device-to-device (D2D) sounding reference signal (SRS) transmission and non-D2D SRS transmission on cell-specific D2D subframes in accordance with an example.

FIGS. 3A-B illustrates multiplexing of D2D and non-D2D SRS transmissions on cell-specific D2D subframes. FIG. 3A illustrates a D2D SRS bandwidth in the frequency domain, and FIG. 3B illustrates a D2D SRS (UE0/UE1) multiplexing with legacy LTE SRS bandwidth (UE2) in the frequency domain. The D2D SRS bandwidth can be fixed (e.g., no frequency hopping) and broadcasted in the SIB information to enable the D2D SRS signal to be detectable by other D2D UEs. Moreover, the value of D2D SRS bandwidth may re-use a legacy SRS bandwidth configuration (i.e., 4 PRBs in the frequency domain) or alternatively, a set of new values which are less than a minimum SRS bandwidth value. For example, D2D SRS signal bandwidth in the frequency domain can be predefined as one PRB.

The transmission power of the D2D SRS can be explicitly broadcasted in the SIB information or implicitly signaled according to a one-to-one mapping, as shown in Table 1, with a configured D2D SRS bandwidth, as depicted in FIGS. 3A-B. As shown in Table 1, a one-to-one mapping between a D2D SRS bandwidth (BW) and a corresponding predefined transmission power can exist in implicit signaling (e.g., D2D SRS bandwidth), so the UE can subsequently determine an allowed transmission (Tx) power once a BW value is detected. The one-to-one mapping (e.g., Table 1) can be pre-defined by specification and pre-known by each D2D UE as apriori-knowledge or initially signaled to each D2D UE for subsequent use.

TABLE 1

| Index | D2D SRS bandwidth | Tx power for D2D SRS |
| --- | --- | --- |
| #0 | BW0 | Tx_Power 0 |
| #1 | BW1 | Tx_Power 1 |
| ... | ... | ... |
| #n | BWn | Tx_Power n |

UE-Specific D2D SRS Configuration

As an alternative to a cell-specific D2D SRS configuration, a UE-specific D2D SRS configuration can be used. Regarding the UE-specific D2D SRS configuration, two types of D2D SRS transmissions can be supported for each D2D capable UE: A periodic D2D SRS transmission, such as LTE type-0 D2D SRS, and aperiodic SRS, such as LTE type-1 D2D SRS, which can be characterized as a "one-shot" transmission. In an example, the device discovery method can use periodic D2D SRS configuration (e.g., LTE type-0 D2D SRS configuration) or an aperiodic D2D SRS configuration (e.g., LTE type-1 D2D SRS configuration). The periodic D2D SRS configuration allows the node (e.g., eNB) to periodically schedule the SRS for specified wireless devices (e.g., UEs) for device discovery. The aperiodic D2D SRS configuration allows a node (e.g., eNB) to trigger the wireless device (e.g., UE) to transmit a one-shot aperiodic SRS for device discovery using a specified time frame and/or triggering mechanism.

The UE-specific D2D SRS configurable parameters can include a cyclic shift value, a frequency domain location, a transmission combination (comb), a subframe index, and a periodicity. A periodicity may not be used in a LTE type-1 D2D SRS since the transmissions may be triggered instead of repeating a D2D SRS transmission pattern. For the periodic D2D SRS, the subframe index and periodicity can be joint coded and signaled through a single parameter, such as an IE "srs-ConfigIndex" as shown in FIG. 8.

For example, UE0 in FIG. 3B can have D2D capability and transmit SRS in a D2D SRS bandwidth, which may be smaller than a legacy SRS bandwidth, using comb #1 and cyclic shift #1. UE1 can also have D2D capability and transmit SRS using comb #1 but with cyclic shift #3. In an example, the SRS can use a same Zadoff-Chu sequence as a UL demodulation reference signal (DM-RS). Since the cyclic shift versions of the Zadoff-Chu sequence are orthogonal, several UEs (e.g., up to 8) can transmit using different cyclic shifts on a same physical radio resource. A Zadoff-Chu sequence is a complex-valued mathematical sequence which, when applied to radio signals, gives rise to an electromagnetic signal of constant amplitude, whereby cyclically shifted versions of the sequence imposed on a signal result in zero cross-correlation with one another at a receiver. A generated Zadoff-Chu sequence that has not been shifted is known as a base sequence (e.g., CS #0) or a root sequence. The assignment of SRS or DM-RS base sequences can be cell-specific where wireless devices scheduled for an uplink transmission in a cell can be assigned a same base sequence and different cyclic shifts (CS) to provide orthogonality between simultaneous SRS or DM-RS transmissions from wireless devices within a cell.

UE2 in FIG. 3B may not have D2D capability (i.e., non-D2D capability) and may transmit an SRS in the legacy SRS bandwidth, using comb #2 and cyclic shift #1. The SRS or D2D SRS may be used for channel quality estimation.

The UE-specific D2D SRS configurations for LTE type-0 and type-1 D2D SRS can be separately indicated in one RRC message. A D2D capable UE can commence the aperiodic D2D SRS transmission on a first UE-specific D2D SRS subframe k, satisfying k≥n+4 upon detection of an aperiodic SRS request in subframe n. For example, the aperiodic D2D SRS transmission can occur on a first UE-specific D2D SRS that is at least 4 subframes after the aperiodic SRS request. The aperiodic SRS request can be signaled using a legacy physical downlink control channel (PDCCH) or an enhanced PDCCH (ePDCCH).

Figure 4A:
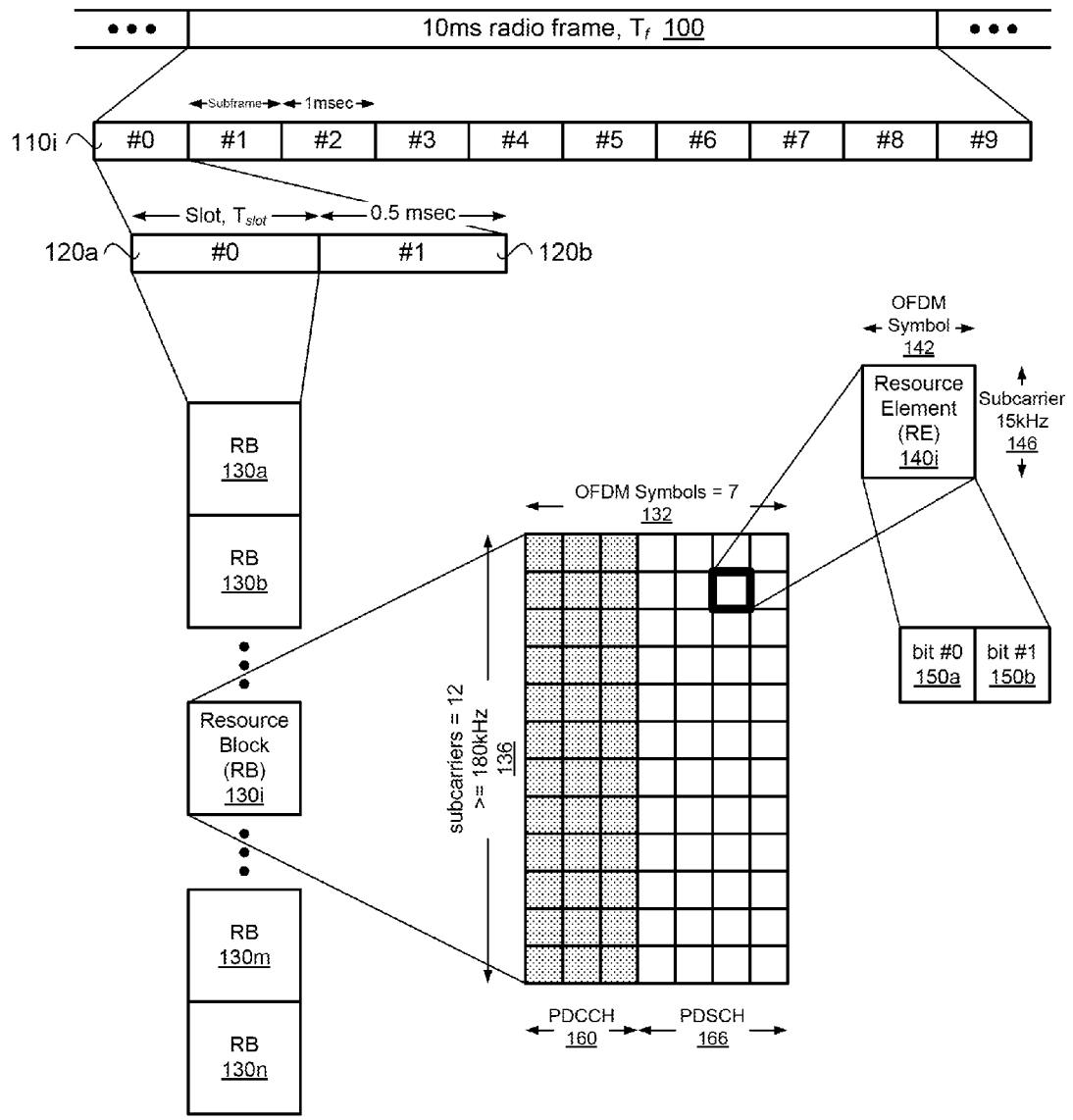
FIG. 4A illustrates a diagram of radio frame resources (e.g., a resource grid) for a downlink (DL) transmission in accordance with an example.

In one example, the legacy PDCCH and PDSCH can represent elements of a radio frame structure transmitted on the physical (PHY) layer in a downlink transmission between a node (e.g., eNodeB) and the wireless device (e.g., UE) using a generic long term evolution (LTE) frame structure, as illustrated in FIG. 4A. An uplink transmission may have a similar frame structure to the downlink transmission used in to transmit uplink information, such as the sounding reference signal (SRS) and physical uplink shared channel (PUSCH), from the wireless device to the node.

FIG. 4A illustrates a downlink radio frame structure type 2. In the example, a radio frame 100 of a signal used to transmit the data can be configured to have a duration, Tf, of 10 milliseconds (ms). Each radio frame can be segmented or divided into ten subframes 110$i$ that are each 1 ms long. Each subframe can be further subdivided into two slots 120$a$ and 120$b$, each with a duration, Tslot, of 0.5 ms. The first slot (#0) 120$a$ can include a legacy physical downlink control channel (PDCCH) 160 and/or a physical downlink shared channel (PDSCH) 166, and the second slot (#1) 120$b$ can include data transmitted using the PDSCH.

Each slot for a component carrier (CC) used by the node and the wireless device can include multiple resource blocks (RBs) 130$a$, 130$b$, 130$i$, 130$m$, and 130$n$ based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or physical RB (PRB), when a legacy PDCCH is used. The remaining 11 to 13 OFDM symbols in the subframe may be allocated to the PDSCH for data (for short or normal cyclic prefix).

Each RB (physical RB or PRB) 130$i$ can include 12 15 kHz-subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix (CP) is employed. The RB can use six OFDM symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150$a$ and 150$b$ of information in the case of quadrature phase-shift keying (QPSK) modulation. Other types of modulation may be used, such as 16 quadrature amplitude modulation (QAM). 64 QAM, 128 QAM, 256 QAM and so forth to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB, or the RB can be configured for D2D transmission between the UE and a proximity UE in proximity to the UE.

Aperiodic D2D SRS Triggering

The PDCCH or ePDCCH can be used for aperiodic D2D SRS triggering (e.g. LTE type-1 D2D SRS triggering). A downlink control information (DCI) format can be defined to trigger the aperiodic D2D SRS transmission for a group of D2D UEs. Each D2D UE can be allocated a discovery radio network temporary identifier (D-RNTI) which can be used for scrambling the cyclic redundancy check (CRC) part attached to D2D specific DCI format. Cyclic redundancy check (CRC) can be an error detecting code appended to a block of data to be transmitted. The value of the CRC can be calculated from the block of data. The length of the CRC can determine the number of errors which can be detected in the block of data on reception of the data. A CRC may not be able to correct errors or determine which bits are erroneous.

The D-RNTI allocation may be based on the D2D UE's positioning or the D2D devices detected, and feedback the information to eNB during the device discovery process. D2D UEs not transmitting a D2D SRS can monitor the PDCCH for a D-RNTI value on the CRC part. The D-RNTI allocation and detection can provide a mechanism for a scenario when a new D2D UE initially accesses a network (e.g., LTE network) and attempts to quickly discover as many D2D UEs as possible. The DCI format size can be extended by adding padding bits to be a same size as legacy DCIs into a candidate's limited size in order to reduce the blind decoding complexity for the UE.

Blind decoding can be used detect a UE's DCI. The UE may only be informed of the number of OFDM symbol within the control region of a subframe and may not be provided with an exact location of the UE's corresponding PDCCH. The PDCCH or ePDCCH can provide control information to multiple UEs in a cell for each subframe k. The UE can perform blind decoding since the UE may be aware of the detailed control channel structure, including the number of control channels (CCHs) and the number of control channel elements (CCEs) to which each control channel is mapped. Multiple PDCCHs can be transmitted in a single subframe k which may or may not be relevant to a particular UE. Because the UE does not know the precise location of the DCI information in a PDCCH, the UE can search and decode the CCEs in the PDCCH until the DCI is found for the UE's CCs. The PDCCH candidates for DCI detection can be referred to as a search space. The UE can find the PDCCH specific to the UE (or the UE's CCs) by monitoring a set of PDCCH candidates (a set of consecutive CCEs on which the PDCCH could be mapped) in a PDCCH search space in each subframe.

In the 3GPP LTE specification, such as in Release 8, 9, 10, or 11, the UE can use a radio network temporary identifier (RNTI) that can be assigned to the UE by the eNB to try and decode candidates. The RNTI can be used to demask a PDCCH candidate's cyclic redundancy check (CRC) that was originally masked by the eNB using the UE's RNTI. If the PDCCH is for a specific UE, the CRC can be masked with a UE unique identifier, for example a cell-RNTI (C-RNTI) used in a downlink. If no CRC error is detected the UE can determine that a PDCCH candidate carries the DCI for the UE. If a CRC error is detected then the UE can determine that PDCCH candidate does not carry the DCI for the UE and the UE can increment to the next PDCCH candidate. The UE may increment to the next PDCCH candidate in the search space based on the CCE aggregation level.

Figure 4B:
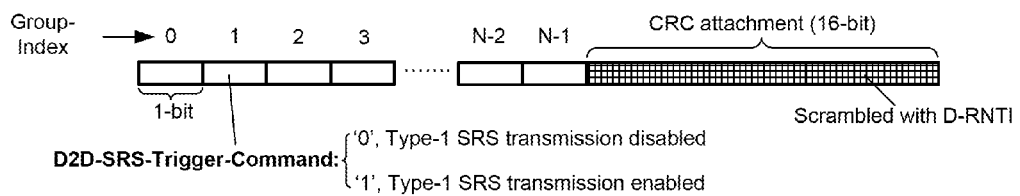
FIG. 4B illustrates a diagram of a downlink control information (DCI) format for a long term evolution (LTE) type-1 device-to-device (D2D) sounding reference signal (SRS) transmission in accordance with an example.

For device discovery, a D-RNTI can be used by the D2D capable UEs. Since the D-RNTI can be common to a group of D2D UEs, each UE can be allocated an exclusive index, such as "Group-Index", to identify the UEs in the same D2D group. The exclusive index (e.g., group index) allows the eNB to indicate which UEs in the same D2D group can transmit an aperiodic D2D SRS after receiving one DCI format scrambling with the group's D-RNTI. In an example, a D-RNTI can also be used by all the D2D capable UEs in a cell, so practically D-RNTI can be used in a cell-specific way. FIG. 4B illustrates a DCI format for a LTE group type-1 D2D SRS transmission. For example, a bit can be used to specify which UEs (via a group index) in the group (via a D-RNTI) enable aperiodic SRS transmissions (LTE type-1 D2D SRS transmissions) and which UEs disable aperiodic SRS transmissions for a subframe. For instance, a '0' bit in a bit position representing a group index can represent a disabled LTE type-1 SRS transmission, and a '1' bit in a bit position representing a group index can represent an enabled LTE type-1 SRS transmission.

Aperiodic D2D SRS triggering (e.g. LTE type-1 D2D SRS triggering) can be used for periodic D2D SRS detection and aperiodic D2D SRS detection. Wireless devices using periodic D2D SRS detection can be multiplexed together in a same discrete Fourier transform-spread (DFTS) OFDM (DFTS-OFDM) symbol (e.g., single-carrier frequency-division multiple access [SC-FDMA]), as shown in FIG. 3A, so the wireless devices may not be able to detect each other without aperiodic D2D SRS triggering.

Figure 5:
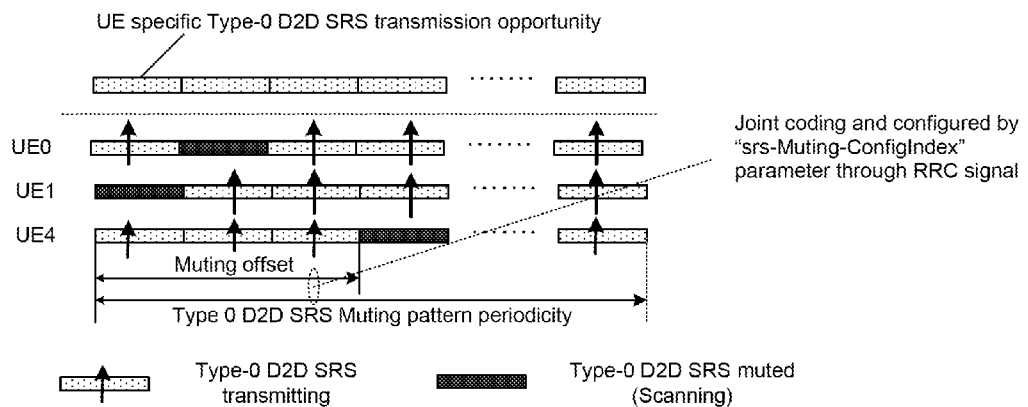
FIG. 5 illustrates a diagram of device-to-device (D2D) sounding reference signal (SRS) muting pattern for a long term evolution (LTE) type-0 D2D SRS transmission in accordance with an example.

Periodic D2D SRS triggering can use a D2D SRS muting pattern to determine which UEs scan and which UEs transmit, which can be explicit signaled or implicitly determined. For example, FIG. 5 illustrates a D2D SRS muting pattern, assuming a type-0 SRS configuration for UE0, UE1, and/or UE4 are co-located in one SC-FDMA symbol (as shown in FIG. 3A).

For a D2D SRS muting pattern for a LTE type-0 D2D SRS transmission, one SRS transmission opportunity can be selected every multiple consecutive UE-specific type-0 D2D SRS transmission opportunities for muting, which can be different for co-located D2D UEs. At the muted opportunity, a D2D UE can "listen" and/or "scan" the other UEs' type-0 SRS signal for device discovery. The exact pattern can be either explicitly configured by RRC signaling (option 1), as shown in FIG. 5, or alternatively implicitly determined by a UE identity (option 2).

The smallest unit of a D2D SRS transmission opportunity can be equal to the smallest unit of a legacy LTE SRS transmission opportunity. In a 3GPP LTE system, the smallest unit of an SRS transmission opportunity can be once per two uplink subframes for an FDD system (e.g., once per 2 ms). While for a TDD system, the smallest unit of SRS transmission can be twice per five subframes (e.g., twice per 5 ms).

For an example of implicit determination of the muted opportunity (option 2), the UEs can implicitly determine which one of the multiple consecutive type-0 D2D SRS transmission opportunities is muted according to pseudo-random sequence $I_{muted\_SRS}$ initialized by the UE identity, which can be represented by Equation 1.

$$I_{muted\_SRS} = \left( \sum_{i=0}^{7} c(8 \cdot \text{Index\_T} + i) \cdot 2^i \right) \bmod T \quad \text{[Equation 1]}$$

The pseudo-random sequence c(i) for subframe index "i" is defined in a LTE system, parameter "T" is the D2D SRS muting pattern periodicity, and Index_T is a periodicity index. The pseudo-random sequence generator can be initialized with $$c_{init} = \left\lfloor \frac{N_{ID}^{UE}}{30} \right\rfloor \cdot 2^5,$$

where $N_{ID}^{UE}$ is the UE identity.

Aperiodic D2D SRS triggering can use a D-RNTI assigned to the D2D capable UEs or a set A of C-RNTIs assigned to the D2D capable UEs. The use of the D-RNTI and the set A of C-RNTIs can be used for the aperiodic D2D SRS transmissions and also other types of beacon signals (e.g., preamble type) for the purpose of a discovery.

The D-RNTI can be assigned to UEs that may be close to each other based on some location information, such as from a global positioning system (GPS), an observed time difference of arrival (OTDOA), a cell-ID, a WiFi access point (AP), or another location mechanism or service. One or more bit fields in a DCI can be used to indicate the UE to transmit the aperiodic D2D SRS. The indicated UE can transmit the D2D SRS and other UEs may perform the detection of the D2D SRS from the intended UE for device discovery. A device-specific search space for D-RNTI can be defined based on a function of D-RNTI, or alternatively, transmitted on common search space (CSS). In legacy LTE, a device-specific search space (e.g., UE specific search space) is defined based on C-RNTI. For common search spaces, $Y_k$ is set to 0 for the two aggregation levels L=4 and L=8. For a UE-specific search space $S_k^{(L)}$ at aggregation level L, the variable $Y_k$ is defined by $Y_k=(A \cdot Y_{k-1})\mod D$, where $Y_{-1}=D_{RNTI}\neq 0$, A=39827, D=65537 and $k=\lfloor n_s/2 \rfloor$, $n_s$ is the slot number within a radio frame. The RNTI value used for $D_{RNTI}$ can be the D-RNTI.

If the DCI with D-RNTI is transmitted in common search space, the DCI may not schedule any data (e.g., PUSCH or PUSCH). Some fields for scheduling, like the resource allocation, can be reserved and used for aperiodic D2D SRS triggering for backward compatibility. For example, in a case that the aperiodic D2D SRS triggering for device discovery is used, the UEs can assume that no data is scheduled for the same time-frequency resource as a D2D SRS, so the PUSCH and the D2D SRS from different UEs do not collide.

Detecting the DCI with the D-RNTI can reduce the power consumption in the UE receiver. For example, the control region (e.g., PDCCH) of each serving cell can include a set of CCEs. Allowing the eNodeB to place a DCI anywhere in the PDCCH resources, can require the UE to make many PDCCH decoding attempts in every subframe and can lead to excessive power consumption in the UE receiver. So, in the LTE system, to avoid or reduce excessive PDCCH decoding attempts, a limited set of CCE locations where a PDCCH may be placed in a search space can be defined for each UE and each search space (e.g., D2D search space) can be determined by a UE-RNTI (e.g., D-RNTI value and shared by a group of D2D UEs) and a subframe index.

In another aperiodic D2D SRS triggering example, the network can configure a set A of C-RNTIs to the UEs which may be close to each other based on some location information, such as from the GPS, OTDOA, Cell-ID, WiFi AP, or another location mechanism or service. For example, if the network triggers aperiodic D2D SRS for a C-RNTI#0, the UE within the set A with the C-RNTI#0 can transmit the D2D SRS. The other UEs within the set A with other C-RNTIs can detect the D2D SRS from the UE with the C-RNTI#0. In order not to increase blind decoding complexity for UEs using the set A with other C-RNTIs, the DCI transmission (in an example) can be restricted to common search space. Some fields for scheduling, like the resource allocation, can be reserved and used for aperiodic D2D SRS triggering for backward compatibility. For example, in case that the aperiodic D2D SRS triggering for device discovery is used, the UEs can assume that no data is scheduled for the same time-frequency resource as a D2D SRS, so the PUSCH and the D2D SRS from different UEs do not collide.

UE Feedback

After aperiodic D2D SRS triggering and/or D2D SRS detection, the UE can feedback related D2D SRS relevant information including a D2D SRS subframe index, a frequency location, a comb index, and/or cyclic shift (CS) value, to the node.

Device Discovery Signaling Procedures

With the overview of device discovery signal design (part 1), the device discovery signaling can be used in signaling procedures for device discovery (part 2). FIG. 6 illustrates some principles applied to resource allocation of a device discovery signal. For example, the eNB 292 can broadcast to a UE 290 a cell-specific D2D SRS resources configuration 300 in the SIB information, which can be dependent on a cell-specific SRS configuration. D2D SRS resources can be flexibly configured to occupy a subset (as shown in FIG. 2B) of cell-specific SRS resources. The number of downlink subframes of the subset can be configurable depending on the number of D2D users.

An example information element for cell-specific D2D SRS resources configuration (e.g., D2D-SoundingRS-UL-ConfigCommon) is illustrated in FIG. 7. Field descriptions for D2D-SoundingRS-UL-ConfigCommon can include srs-BandwidthConfig, srs-Bandwidth, srs-SubframeConfig, transmission Comb, CyclicShift, and SRS-PowerConfig. The srs-BandwidthConfig can indicate the full bandwidth for D2D SRS transmission of the whole cell. The srs-Bandwidth can indicate the bandwidth for a single D2D SRS transmission and reception. The srs-SubframeConfig can indicate the cell-specific D2D SRS resources by jointly coding the periodicity and offset value. The transmissionComb can indicate the cell-specific D2D SRS resources configuration in the comb domain. The CyclicShift can indicate the cell-specific D2D SRS resources configuration in the cyclic shift domain. The SRS-PowerConfig can indicate the transmission power for D2D SRS. The SRS-PowerConfig value maybe implicitly configured by one-to-one mapping between srs-Bandwidth and SRS-PowerConfig.

Referring back to FIG. 6, the UE 290 supporting D2D communication can transmit (or transfer) the UE's capability (i.e., UE's capability information 302) of D2D communication to the eNB 292 via RRC signaling. D2D communication can supported as an optional UE capability in advanced LTE devices, such as devices supporting LTE Rel-12 and subsequent releases. A D2D enabling UE can include a baseband modem for decoding and/or detecting SC-FDMA waveforms (typically used in uplink channels) at the receiver, which functionality may not be supported by legacy LTE UEs, such as devices supporting LTE Rel-11 and earlier releases.

In an example, the eNB 292 can keep capabilities during RRC CONNECTED state and build one UERadioAccess-CapabilityInformation message consisting of known capabilities excluding the UTRAN capability 304. The UE capabilities including D2D support can then be uploaded to the mobility management entity (MME) 294 and/or packet data network-gateway (PDN-GW or PDN GW) via a S1-application protocol (S1-AP or S1AP) UE capability information indication (e.g., UE CAPABILITY INFO INDICATION) message 306 to enable the D2D communication between eNBs of serving neighboring cells.

The MME 294 can keep the capabilities until a S1-AP DETACH or ATTACH message 308. The PDN-GW can be used to detect the potential D2D traffic whose tunnel endpoint identifiers are the same or assigned to neighboring eNBs, since the PDN-GW can process the IP headers of the data packets and tunnel headers. Thus, the PDN-GW can determine by which eNB a UE is served. Since the MME and/or PDN-GW can retain the UE's capability information, D2D communication can be alternatively triggered by the eNB 292, instead of by D2D capability of UEs, after the eNB has received the D2D enabling type of message from PDN GW.

Separate IEs in the RRC signal for UE D2D resources allocation information for discovery 310 can be used to transfer the UE-specific LTE type-0 and type-1 D2D SRS configurable parameters (e.g., periodic and aperiodic D2D SRS configurable parameters) respectively from the network (e.g., eNB 292 and/or MME 294) to the UE 290. FIG. 8 illustrates a RRC IE D2D-SoundingRS-UL-ConfigDedicated-r12 for periodic (type-0) D2D SRS transmissions, and a RRC IE D2D-SoundingRS-UL-ConfigDedicatedAperiodic-r12. The parameters in D2D-SoundingRS-UL-ConfigDedicated-r12 can be applicable for a LTE type-0 D2D SRS transmission, while the parameters in D2D-SoundingRS-UL-ConfigDedicatedAperiodic-r12 can be applicable for a LTE type-1 D2D SRS transmission. Field descriptions for D2D-SoundingRS-UL-ConfigDedicated-r12 and/or D2D-SoundingRS-UL-ConfigDedicatedAperiodic-r12 can include freqDomainPosition, srs-ConfigIndex, transmissionComb, CyclicShift, Srs-Muting-ConfigIndex, D-RNTI, and Group-Index. The freqDomainPosition can indicate the frequency domain position for the periodic and aperiodic sounding reference signal (SRS) transmission, respectively. The srs-ConfigIndex can indicate the $I_{SRS}$ parameter for the periodic and aperiodic sounding reference signal (SRS) transmission, respectively. The transmissionComb can indicate the $\overline{k}_{TC} \in \{0,1\}$ parameter for the periodic and aperiodic sounding reference signal (SRS) transmission, respectively. The CyclicShift can indicate the n_SRS parameter for the periodic and aperiodic sounding reference signal (SRS) transmission, respectively, where cs0 corresponds to 0, and so on. The Srs-Muting-ConfigIndex can indicate the muting type-1 D2D SRS configuration for the periodic sounding reference (SRS) signal transmission. The D-RNTI can indicate the RNTI for aperiodic D2D SRS group triggering using specific DCI format for D2D communication. The Group-Index can indicate the index of the UE sharing a single D-RNTI within a D2D SRS group.

The UE 290 can scan, detect, and/or decode the D2D SRS resources at each cell-specific D2D SRS opportunity, for either type-0 or type-1 D2D SRS, and then feedback the detected SRS resources to the eNB for a device discovery report purpose (not shown in FIG. 6). For example, FIG. 9 illustrates an example abstract syntax notation one (ASN.1) code for a feedback IE SRSDetectedReport.

If the eNB has already determined the number of UEs to be detected before discovery, the eNB can signal the UE specific SRS parameter via dedicated RRC signaling (also not shown in FIG. 6). The UEs can scan, detect, and/or decode the configured SRS resources instead of detecting all D2D resources at each cell-specific D2D SRS opportunity. The configured SRS resource to be detected can be defined as detectable SRS resource (e.g., IE D2D-SoundingRS-UL-ConfigDedicatedAperiodic-r12), as illustrated in FIGS. 10 and 11. In another example, some of the parameters can be omitted if the parameter is not necessary. For example, if frequency hopping is not supported for SRS in D2D operation, srs-HoppingBandwidth may not be included in the IE D2D-SoundingRS-UL-ConfigDedicatedAperiodic-r12, illustrated in FIG. 11.

After the UE measures the detectable SRS, the UE can feedback the detected SRS resources. The same feedback IE illustrated in FIG. 9 can be used. Alternatively, IE srs-ConfigIndex can be reported, if the received signal quality of SRS is larger than a threshold, as illustrated in FIG. 12.

Figure 13:
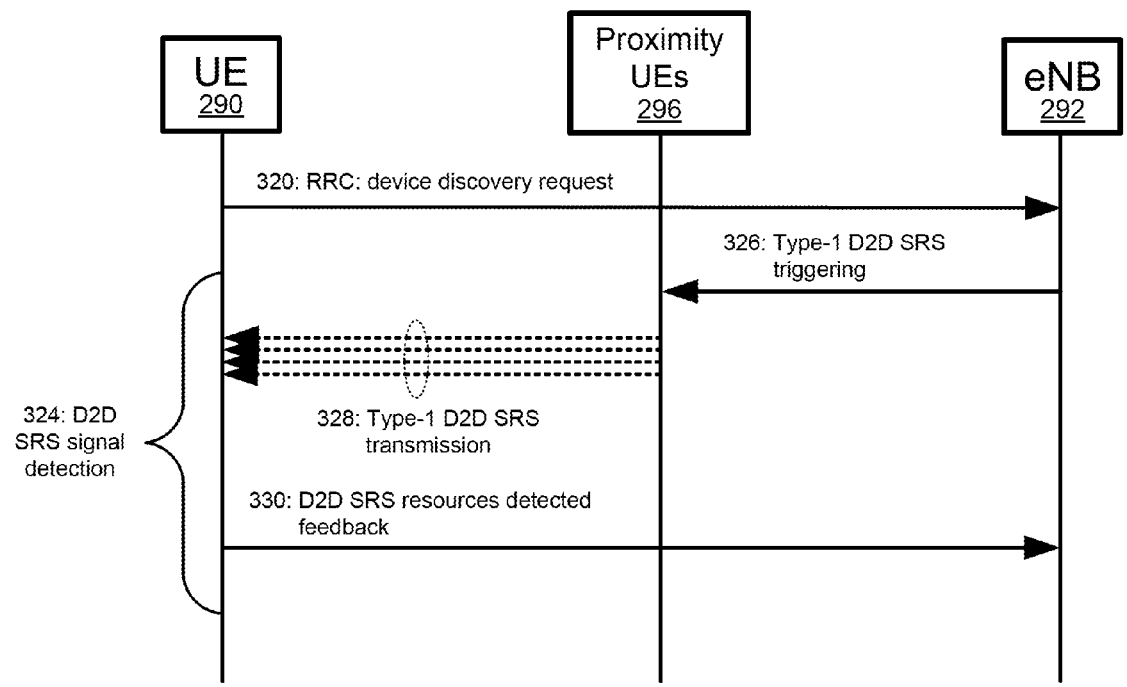
FIG. 13 illustrates an example process for UE initiated device discovery in accordance with an example.

Alternatively, as shown in FIG. 13, a UE 290 can initiate a device discovery process or procedure when the UE desires to discover other UEs in proximity to the UE. For example, the UE can send a device discovery request 320 to the eNB 292 via RRC signaling. The UE can scan the cell-specific D2D SRS subframes for device discovery (e.g., D2D SRS signal detection 324). The eNB can trigger (e.g., type-1 D2D SRS triggering 326) the proximity D2D UEs 296 to commence type-1 D2D SRS transmitting 328 on a first UE-specific D2D SRS subframe. The UE feedback the detected D2D SRS information to eNB (e.g., D2D SRS resources detected feedback 330).

Figure 14:
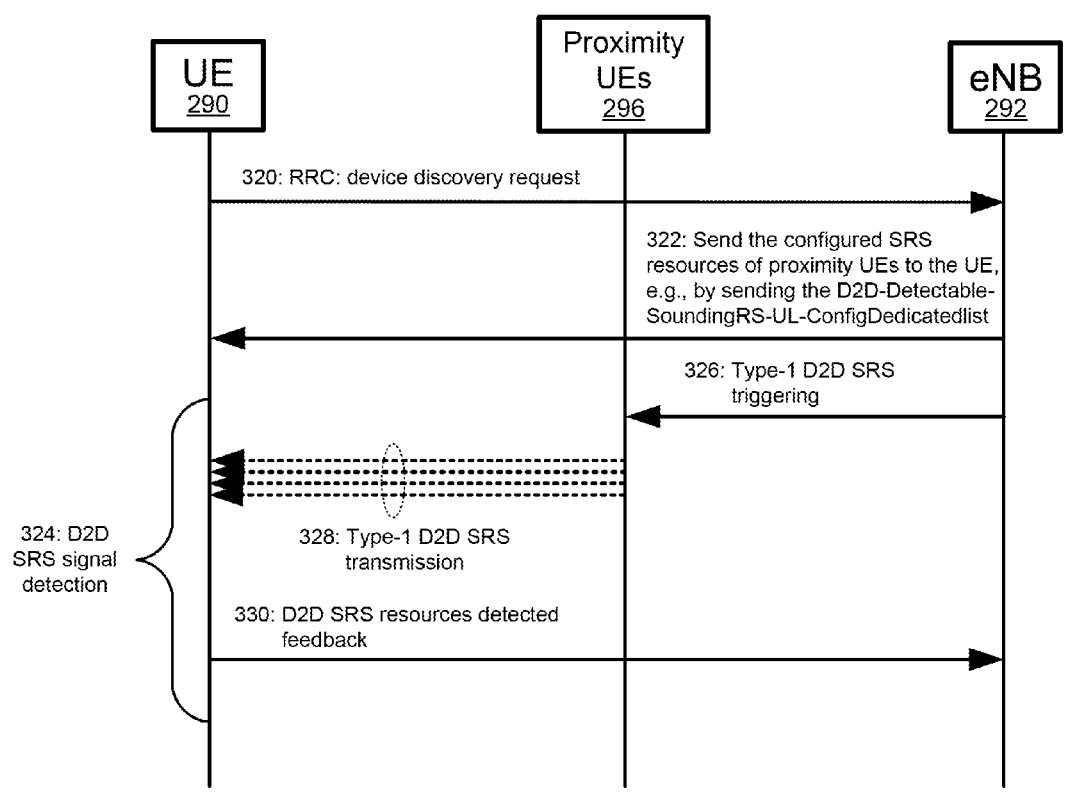
FIG. 14 illustrates an example process for UE initiated device discovery including a UE receiving configured sounding reference signal (SRS) resource of proximity UEs in accordance with an example.

In another example, as shown in FIG. 14, the UE 290 can initiate the device discovery process or procedure when UE wants to discover other UEs in proximity to the UE. The UE can send a device discovery request 320 to the eNB 292 via RRC signaling. The eNB can send the configured SRS resources of proximity UEs to the UE, e.g. by sending the D2D-Detectable-SoundingRS-UL-ConfigDedicatedfist 322. The UE can scan the cell-specific D2D SRS subframes for device discovery (e.g., D2D SRS signal detection 324). The eNB can trigger (e.g., type-1 D2D SRS triggering 326) the proximity D2D UEs 296 to commence type-1 D2D SRS transmitting 328 on a first UE-specific D2D SRS subframe. The UE feedback the detected D2D SRS information to eNB (e.g., D2D SRS resources detected feedback 330).

Figure 15:
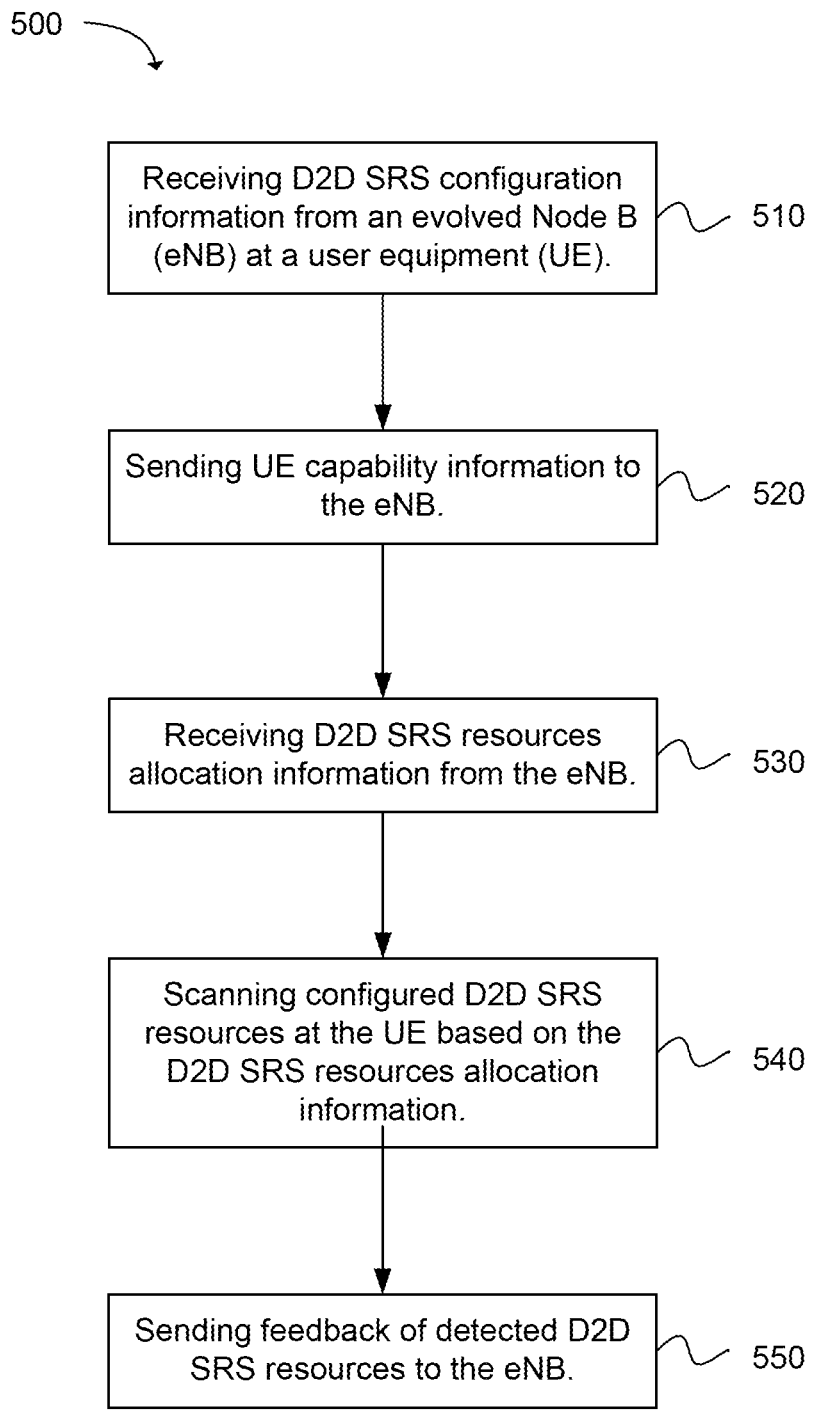
FIG. 15 depicts a flow chart of a method for device discovery using device-to-device (D2D) sounding reference signal (SRS) in accordance with an example.

Another example provides a method 500 for device discovery using a device-to-device (D2D) sounding reference signal (SRS), as shown in the flow chart in FIG. 15. The method may be executed as instructions on a machine or computer circuitry, where the instructions are included on at least one computer readable medium or one non-transitory machine readable storage medium. The method includes the operation of receiving D2D SRS configuration information from an evolved Node B (eNB) at a user equipment (UE), as in block 510. The operation of sending UE capability information to the eNB follows, as in block 520. The next operation of the method can be receiving D2D SRS resources allocation information from the eNB, as in block 530. The operation of scanning configured D2D SRS resources at the UE based on the D2D SRS resources allocation information follows, as in block 540. The method can further include sending feedback of detected D2D SRS resources to the eNB, as in block 550.

The operation of scanning the configured D2D SRS resource can further include scanning D2D SRS resources at each cell-specific D2D SRS opportunity. A periodicity and index of subframes for D2D SRS can be derived from a cell-specific subframe offset for the transmission of D2D SRS or an upper limit of a cell-specific subframe configuration period to avoid a physical uplink shared channel (PUSCH) interference. D2D SRS configuration information can include a cell-specific periodic D2D SRS periodicity at least two times greater than a cell-specific SRS periodicity. In an example, the method can further include transmitting a D2D SRS on fixed frequency domain resources, where frequency hopping on the D2D SRS is disabled.

In another example, the operation of receiving the D2D SRS resources allocation information can further include receiving via radio resource control (RRC) signaling a D2D SRS muting pattern including one selected SRS transmission opportunity to be muted in a repeated pattern of multiple consecutive UE-specific periodic D2D SRS transmissions in a D2D subframe while the remaining periodic D2D SRS transmissions are transmitted. Each co-located D2D UE can use a different SRS transmission opportunity in the time-domain. The method can further include transmitting a D2D SRS on the SRS transmission opportunity allocated to the UE.

In another configuration, the operation of scanning the configured D2D SRS resources can further include implicitly generating a D2D SRS muting pattern including one selected SRS transmission opportunity to be muted in a repeated pattern of multiple consecutive UE-specific periodic D2D SRS transmission in a D2D subframe while the remaining periodic D2D SRS transmissions are transmitted. Muted SRS transmissions in the time-domain for each co-located D2D UE can be implicitly generated using a pseudo-random sequence initialized by a UE identity, and the pseudo-random sequence can be based on a D2D SRS muting pattern periodicity and periodicity index. The method can further include transmitting a D2D SRS on the SRS transmission opportunity allocated to the UE.

In another example, the operation of receiving the D2D SRS resources allocation information can further include receiving via a system information block (SIB) a transmission power for a D2D SRS. The method can further include transmitting a D2D SRS with the transmission power. In another configuration, the operation of receiving the D2D SRS resources allocation information can further include receiving a D2D SRS bandwidth for the D2D SRS. The method can further include: Implicitly determining a D2D SRS transmission power based on the D2D SRS bandwidth, where a one-to-one mapping exists between the D2D SRS bandwidth and the D2D SRS transmission power; and transmitting a D2D SRS with the D2D SRS transmission power.

In another example, a D2D SRS bandwidth for the configured D2D SRS resources can use a single physical resource block (PRB). The operation of receiving the D2D SRS resources allocation information can further include receiving UE-specific periodic SRS configuration information via radio resource control (RRC) signaling. The UE-specific periodic SRS configuration information can include a cyclic shift value, a frequency domain location, a transmission comb, a subframe index, and a periodicity.

In another configuration, the operation of receiving the D2D SRS resources allocation information can further include receiving via dedicated radio resource control (RRC) signaling a limited number of UE specific D2D SRS resources to be detected for a specified number of UEs. The operation of scanning the configured D2D SRS resources can further include scanning the limited number of UE specific D2D SRS resources. The D2D SRS configuration information can include a bandwidth for D2D SRS transmission for a cell, a bandwidth for a single D2D SRS transmission and reception, cell-specific D2D SRS resources periodicity, cell-specific D2D SRS resources offset value, cell-specific D2D SRS resources configuration in a comb domain, cell-specific D2D SRS resources configuration in a cyclic shift (CS) domain, or a transmission power for the D2D SRS. The D2D SRS resources allocation information can include configurable parameters for a periodic D2D SRS transmission, configurable parameters for an aperiodic D2D SRS transmission, a frequency domain position, a SRS configuration index, a transmission comb, a cyclic shift (CS), a SRS muting configuration index, a discovery radio network temporary identifier (D-RNTI), a group index of the UE sharing the D-RNTI, a cell radio network temporary identifier (C-RNTI), a specified set number of C-RNTI for D2D UEs in proximity to each other, a detectable SRS index, a bandwidth for D2D SRS transmission for a cell, or a frequency hopping bandwidth for a D2D SRS transmission. The feedback of the detected D2D SRS resources can include a frequency domain position, time domain position, a transmission comb, or a cyclic shift (CS).

In another example, the operation of scanning the configured D2D SRS resources uses a D2D SRS muting pattern based on a muting offset and a muting periodicity configured via radio resource control (RRC) signaling, and the muting offset and the muting periodicity determine a D2D SRS opportunity to scan. In another configuration, the operation of scanning the configured D2D SRS resources uses an implicit pseudo-random sequence based on a periodicity, periodicity index, and UE identity to determine a D2D SRS opportunity to scan. In another example, the operation of receiving D2D SRS configuration information uses a system information block (SIB), and sending UE capability information and receiving D2D SRS resources allocation information uses radio resource control (RRC) signaling.

Figure 16:
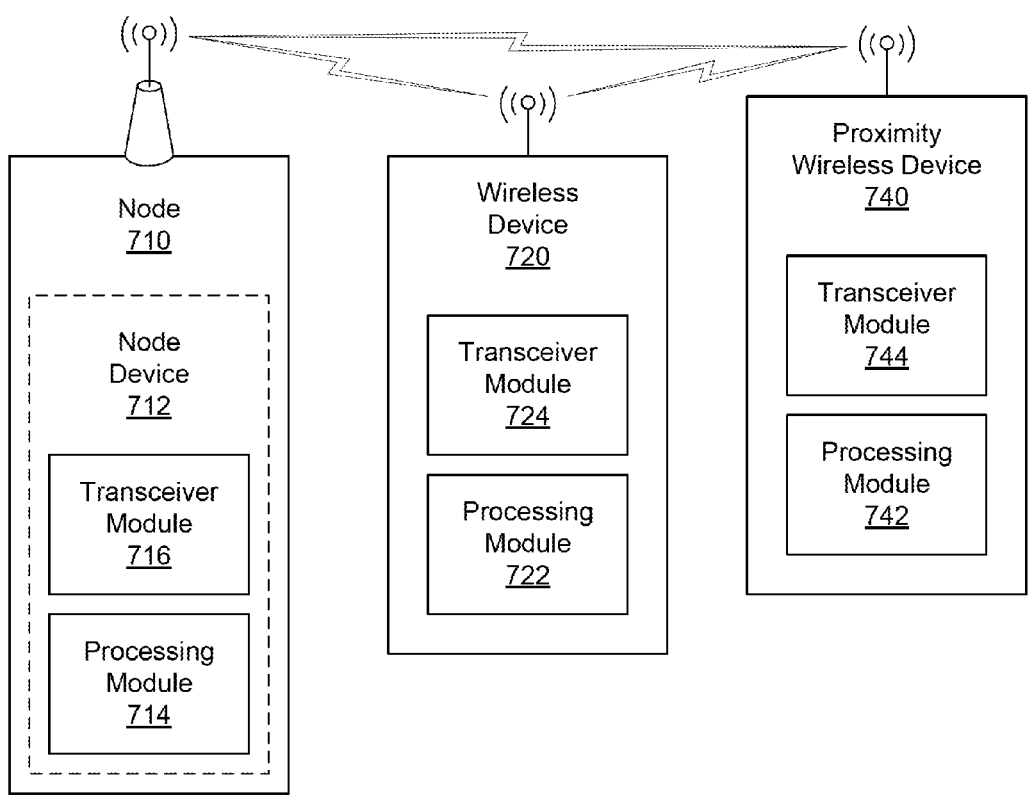
FIG. 16 illustrates a block diagram of a node (e.g., eNB), a wireless device (e.g., UE), and a proximity wireless device (e.g., proximity UE) in accordance with an example.

FIG. 16 illustrates an example node 710 (e.g., eNB) and an example wireless device 720 (e.g., UE) and an example proximity wireless device 740 (e.g., proximity UE) in close proximity to the wireless device. The node can include a node device 712. The node device or the node can be configured to communicate with the wireless device and the proximity wireless device. The node device can be configured to assist the wireless device and the proximity wireless device in device discovery using a device-to-device (D2D) sounding reference signal (SRS). The node device can include a processing module 714 and a transceiver module 716. The transceiver module can be configured to send to the wireless device configured SRS resource information of proximity wireless devices, receive a radio resource control (RRC) device discovery request from the wireless device or the proximity wireless device, transmit aperiodic triggering for the wireless device or the proximity wireless device, and receive feedback from the wireless device of detected D2D SRS information of the proximity UEs. The processing module can be configured to generate a D2D SRS muting pattern for SRS transmission opportunity to be muted and UE-specific periodic D2D SRS transmissions, and process and store wireless device capability information. The node (e.g., serving node 710 and cooperation node 730) can include a base station (BS), a Node B (NB), an evolved Node B (eNB), a baseband unit (BBU), a remote radio head (RRH), a remote radio equipment (RRE), or a remote radio unit (RRU).

The wireless device 720 and proximity wireless device 740 can include a transceiver module 724 and 744 and a processing module 722 and 742. The wireless device can be configured to communicate directly with the proximity wireless device via D2D communication protocols. The wireless device can be configured for configured for device discovery via a node using a device-to-device (D2D) sounding reference signal (SRS). The transceiver module can be configured to: Send a radio resource control (RRC) device discovery request to a node, scan D2D SRS subframes of proximity UEs using D2D SRS triggering, where a proximity UE is located within a same cell as the UE, and send feedback to the node of detected D2D SRS information of the proximity UEs.

In an example, the transceiver module 724 and 744 can be further configured to receive configured SRS resource information of proximity UEs from the node before a scan of D2D SRS subframes of proximity UEs. The configured SRS resources information can includes a radio resource control (RRC) information element (IE) D2D-Detectable-SoundingRS-UL-ConfigDedicatedList that includes a frequency domain position, a SRS configuration index, a transmission comb, a cyclic shift (CS), a detectable SRS index, a bandwidth for D2D SRS transmission for a cell, or a frequency hopping bandwidth for a D2D SRS transmission. The detected D2D SRS information can include a feedback information element (IE) SRSDetectedReport that includes a frequency domain position, time domain position, a transmission comb, or a cyclic shift (CS).

In another example, the transceiver module 724 and 744 can be further configured to transmit D2D SRS subframes to proximity UEs based on downlink control information (DCI) for D2D SRS triggering from the node. A DCI format size for the DCI can be extended to a same size as a legacy DCI by adding padding bits. In another configuration, the transceiver module can be further configured to trigger an aperiodic (e.g., long term evolution (LTE) type-1) D2D SRS transmission for a group of D2D UEs based on a group-specific discovery radio network temporary identifier (D-RNTI) and an exclusive group index of the UE included in downlink control information (DCI). A DCI format for the DCI can be scrambled with the group-specific D-RNTI, and each D2D UE in the group is allocated an exclusive group index to uniquely identify each D2D UE using the D-RNTI.

In another example, the D2D SRS triggering further includes triggering a D2D SRS transmission by a downlink control information (DCI) with CRC scrambled by discovery radio network temporary identifier (D-RNTI) based on location information of the UEs in proximity to each other and a group index provided by higher layer signaling that determines the index to the D2D SRS triggering for the UE sharing the same D-RNTI with other UEs. The processing module 722 and 742 can be configured to detect the DCI for D2D SRS triggering by monitoring a set of physical downlink control channel (PDCCH) candidates in a device-specific search space, which is determined by the D-RNTI or in a common search space (CSS) in each downlink subframe.

In another configuration, the D2D SRS triggering uses aperiodic D2D SRS triggering using a specified set of cell radio network temporary identifiers (C-RNTIs) based on location information of the UEs in proximity to each other. The transceiver module 724 and 744 can be further configured to scan a D2D SRS transmitted from a specified C-RNTI in the specified set.

Figure 17:
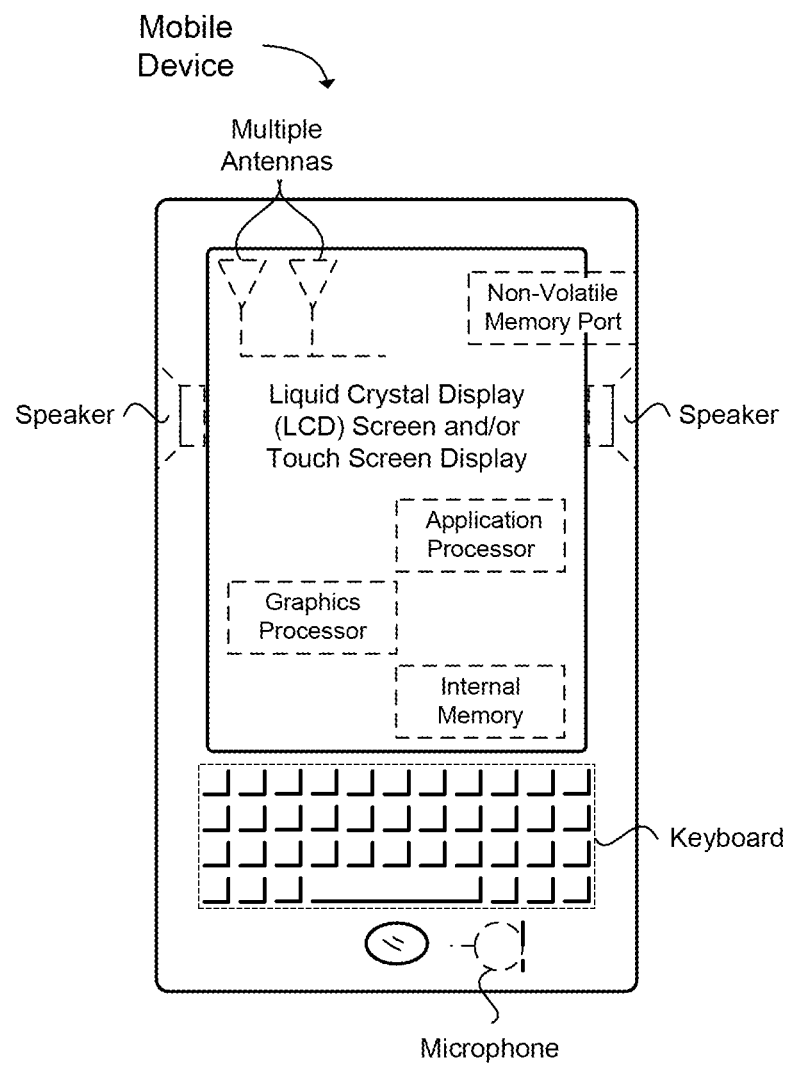
FIG. 17 illustrates a diagram of a wireless device (e.g., UE) in accordance with an example.

FIG. 17 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 17 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Channel Measurement Group (CMG)

Figure 18:
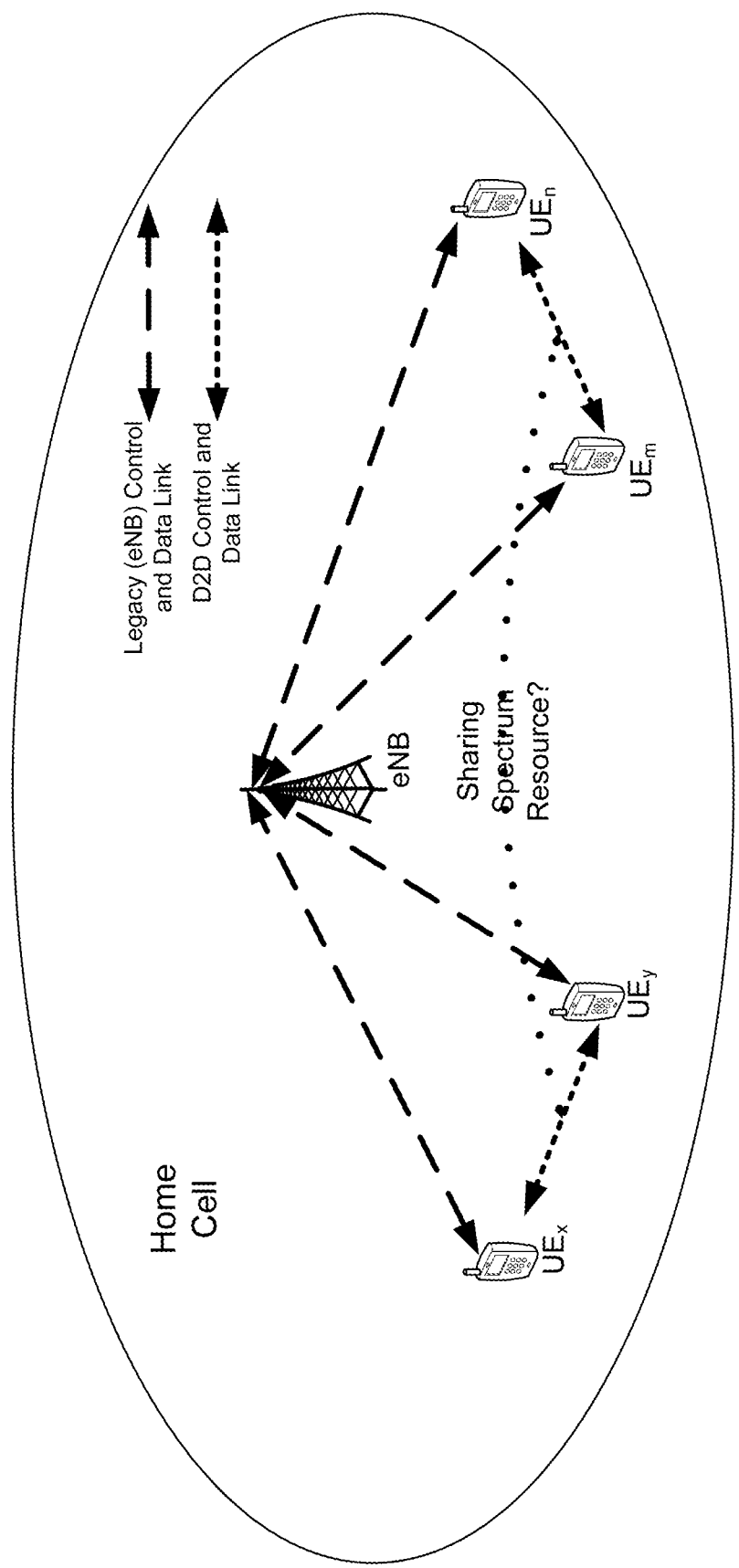
FIG. 18 illustrates a diagram of radio resource sharing between two device-to-device (D2D) pairs of wireless devices (e.g., UEs) in accordance with an example.

In another configuration, device-to-device (D2D) communication can be improved using a channel measurement group. A factor to improve D2D communication system efficiency and to reduce interference in support of different time-division duplexing (TDD) uplink-downlink (UL-DL) configurations can include fetching the channel status information among the UEs by the communication system. FIG. 18 illustrates an example of D2D radio resource sharing between two D2D pairs (e.g., $UE_x$ and $UE_y$; and $UE_m$ and $UE_n$) inside of one cell (e.g., home cell) to optimize the overall system performance using D2D control and data links along with legacy (uplink and downlink with the eNB) control and data links. The D2D control and data links used for the D2D pairs may share spectrum resources. The value of resourcing sharing can be determined by the specific spatial multiplexing used in D2D communication and to the degree interference is controlled when the radio resource is shared between D2D resources. The channel loss (or other details of channel information) among the related UEs (e.g., 4 UEs in FIG. 18) can be measured and collected to determine interference generated and the value of resourcing sharing.

Figure 19:
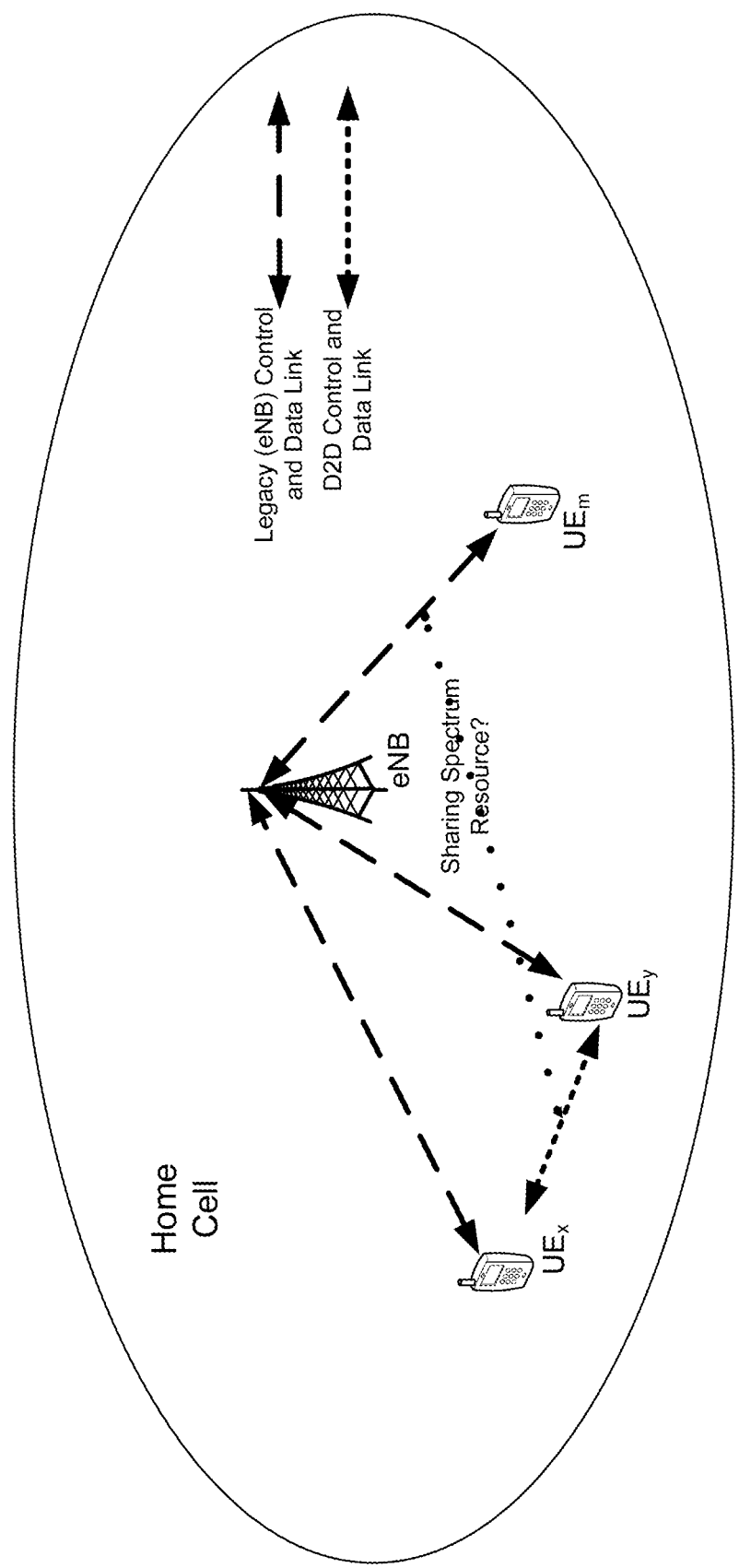
FIG. 19 illustrates a diagram of radio resource sharing between device-to-device (D2D) wireless devices (e.g., UEs) and a node wireless device (e.g., eNB UE) in accordance with an example.

The FIG. 19 shows another example of radio resource sharing between D2D UEs (e.g., $UE_x$ and $UE_y$) and an eNB UE (e.g., $UE_m$ for uplink or downlink) to support the usage of a D2D scenario for interference control and better system performance. The D2D control and data links used for the D2D pairs may share spectrum resources with legacy control and data links. The channel status information, including at least the channel loss, among three related UEs (FIG. 19) can be measured and collected to determine interference generated and the value of using resource sharing between legacy resources and D2D resources.

In legacy LTE, UE may not have a mechanism to measure and report the channel information for UE-to-UE links. An efficient architecture for supporting D2D link measurements can be designed to reuse the existing sounding reference signals (SRS) for D2D communication, which can be used on advanced UEs (e.g., UEs using LTE Rel-12 and later versions).

First the details for the architecture and mechanism for UEs to measure and report the channel information is presented, which architecture and mechanism can be used for D2D mode selection and interference control. Then, an example using the channel information for D2D communication is presented.

Channel Measurement Group—Definition and Management

In an example, the UEs can be configured to measure other UEs in a same group, referred to as a "channel measurement group" (CMG). The CMG allows the UEs to measure the channel status among each other. The CMG can refer to any process, system, or mechanism functioning in a similar manner as the processes and systems described herein. The channel measurement croup (CMG) can include a set of UEs that may perform the channel status measurement among each other. The channel measurement group identity (CMGID or CMG ID) can provide the identity for channel measurement group. Processes for CMG management can include a new CMG creating procedure, a procedure for adding UE(s) into an existing CMG (previously created CMG), and a procedure for removing UE(s) from a CMG. The processes can relate to CMG management and related messages' definition presented for creating the CMG, and adding and releasing UE(s).

Figure 20:
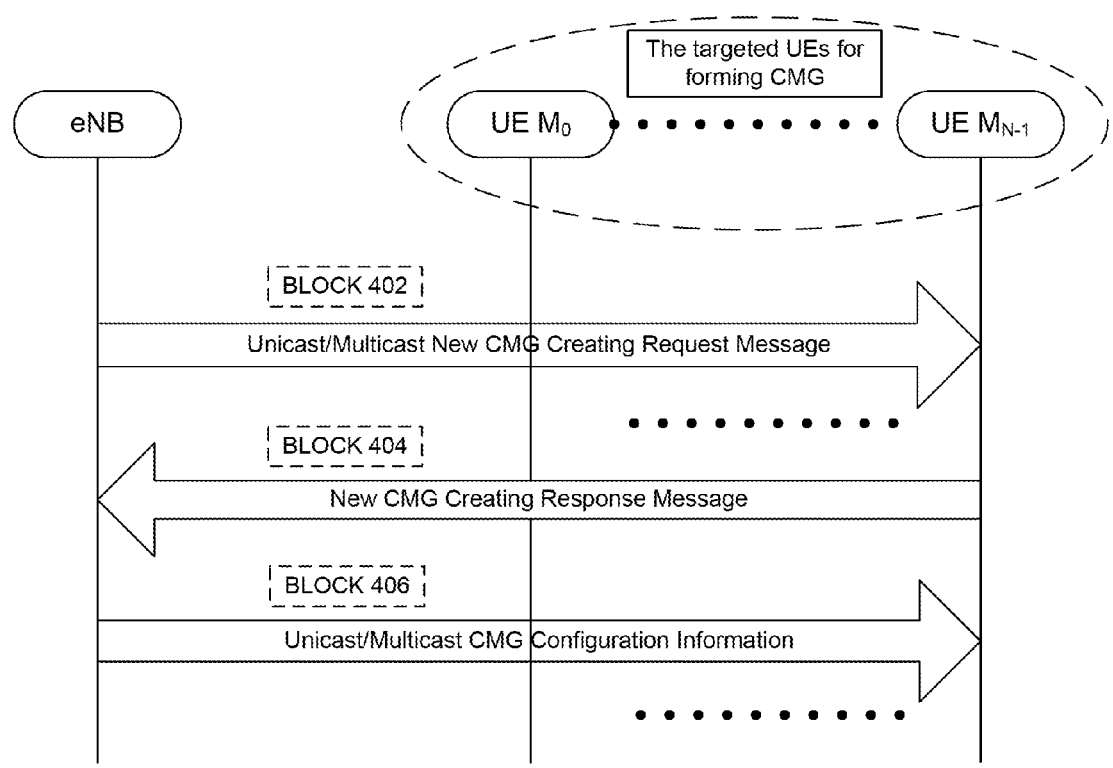
FIG. 20 illustrates an example process for creating a new channel measurement group (CMG) in accordance with an example.

FIG. 20 illustrates the new CMG creating procedure. For example, the eNB can send a unicast or multicast new CMG creating request message (BLOCK 402), such as "NewCMGInitialRequest" message (illustrated in FIG. 21), to candidates UE for the new CMG group. The NewCMGInitialRequest message can be a RRC message used for new CMG creating. The NewCMGInitialRequest field descriptions can include cmgID or cmgReponseDurationTimer. The cmgID can indicate the identity for the CMG to be created. The cmgReponseDurationTimer can indicate the timer length for UE response message received. The NewCMGInitialRequest message may be transmitted via unicast signaling to each candidate UE for the new CMG, or may also be transmitted via multicast signaling to the UEs.

Referring back to FIG. 20, after the candidate UEs receive the NewCMGInitialRequest message (FIG. 21) from the eNB for the CMG creating request, each candidate UE can evaluate the UE's capacity to support the operations related to the new CMG, then reply with a new CMG creating response message (BLOCK 404 of FIG. 20), such as a "NewCMGInitialResponse" message (illustrated in FIG. 22), back to the eNB, so the eNB can make a decision to create the CMG. The NewCMGInitialResponse field descriptions can include cmgID or cmgExecutionAllowed. The cmgID can indicate the identity for the CMG to be created. The cmgExecutionAllowed can indicate a Boolean value, where TRUE indicates that the UE can support CMG related operations, such as channel measurement among the reporting UEs in the CMG, and FALSE indicates that the UE is not able to support the CMG operation.

The eNB can collect the information from the NewCMGInitialResponse messages (FIG. 22) from the replying candidate UEs, then generate a UE list for the CMG, by sending a unicast or multicast CMG configuration message (BLOCK 406 of FIG. 20), such as a "CMGConfigUpdate" message (illustrated in FIG. 23), that can include information to support CMG related operations. The CMGConfigUpdate message can include legacy referenced ASN.1 definitions for IEs PhysicalConfigDedicated and C-RNTI.

For example, the IE PhysicalConfigDedicated can be used to specify the UE specific physical channel configuration. The IE C-RNTI can identify a UE having a RRC connection within a cell. The CMGConfigUpdate message field descriptions can include cmgID, CMGConfig, monitoringUeInfoList, measurementReportInterval, or measurementReportType. The cmgID can indicate the identity for the CMG to be created. The CMGConfig can indicate the configuration structure for the UE to perform CMG operations. The monitoringUeInfoList can indicate the list of UE information for channel measurement and reporting. The measurementReportInterval can indicate the interval of a periodic report of channel measurement result to the eNB. The measurementReportType can indicate the channel measurement result type for reporting. The MonitoringUeInfo field descriptions can include uescheduledC-RNTI or uePhysicalConfigDedicated. The uescheduledC-RNTI can indicate the identity for the UE in the cell. The uePhysicalConfigDedicated can specify the UE specific physical channel configuration.

Figure 24:
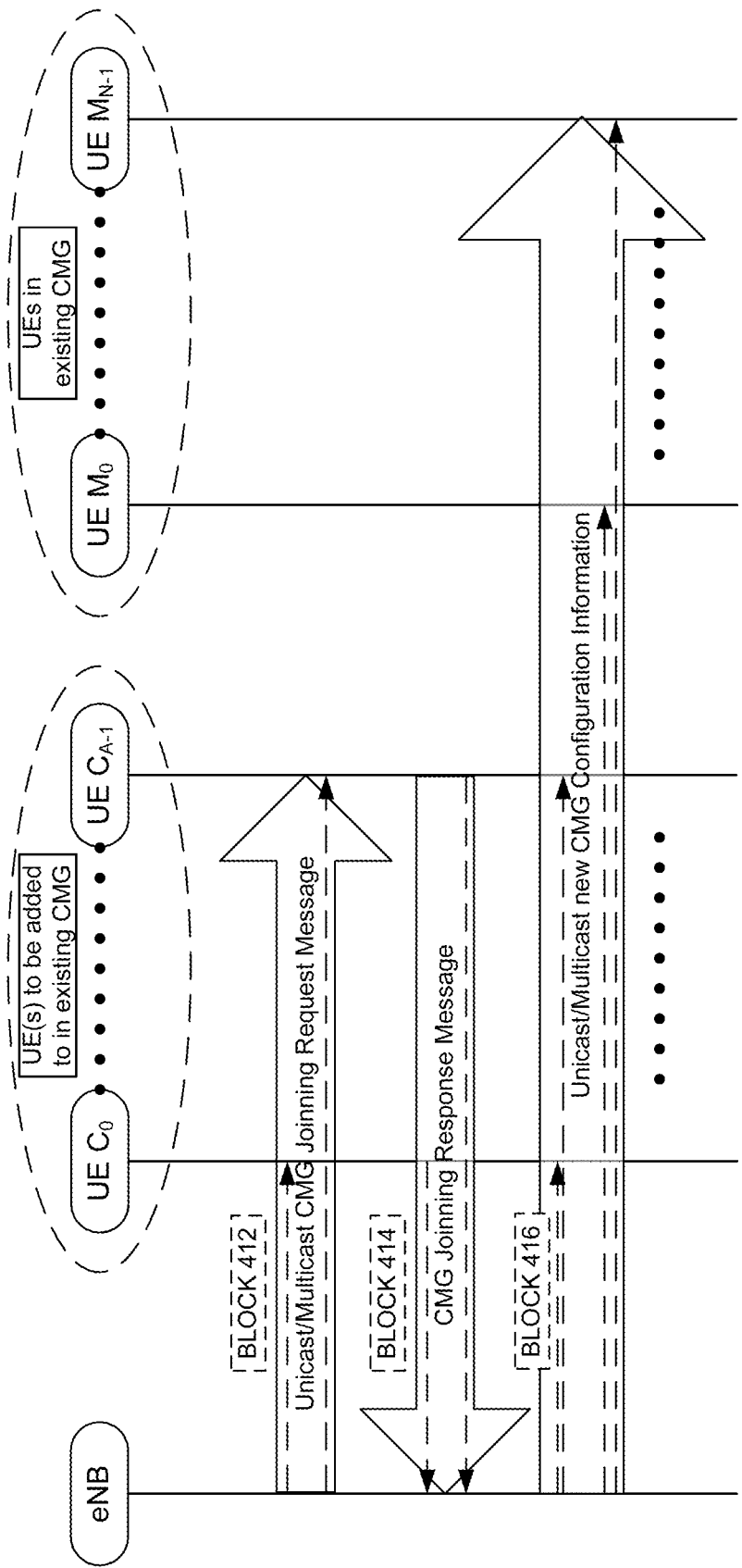
FIG. 24 illustrates an example process for adding UE(s) into a channel measurement group (CMG) in accordance with an example.

FIG. 24 illustrates the procedure for adding UE(s) into the CMG. For example, the eNB can send a unicast or multicast CMG joining request message (BLOCK 412), such as a "CMGJoinRequest" message (illustrated in FIG. 25) to the candidates UE for joining the existing CMG group. The CMGJoinRequest field descriptions can include a cmgID, cmgReponseDurationTimer, or cmgUeCount. The cmgID can indicate the identity for the CMG to be added for candidate UE. The cmgReponseDurationTimer can indicate the timer length for the UE response message received. The cmgUeCount can indicate the UE count in the existing CMG.

After the candidate UEs receive the CMGJoinRequest message (FIG. 25) from the eNB, each candidate UE can evaluate the UE's capacity to support the operations related to the CMG, then reply with a CMG joining response message (BLOCK 414 in FIG. 24), such as a "NewCMGInitialResponse" message (illustrated in FIG. 22), back to the eNB, so the eNB can make a decision to add the UE to the CMG.

The eNB can collect the information from the NewCMGInitialResponse messages (FIG. 22) from the replying candidate UEs for joining the CMG, then generate an updated UE list for the CMG, by sending a unicast or multicast CMG new configuration message (BLOCK 416 of FIG. 24), such as a "CMGConfigUpdate" message (illustrated in FIG. 23), that can include information to support CMG related operations.

Figure 26:
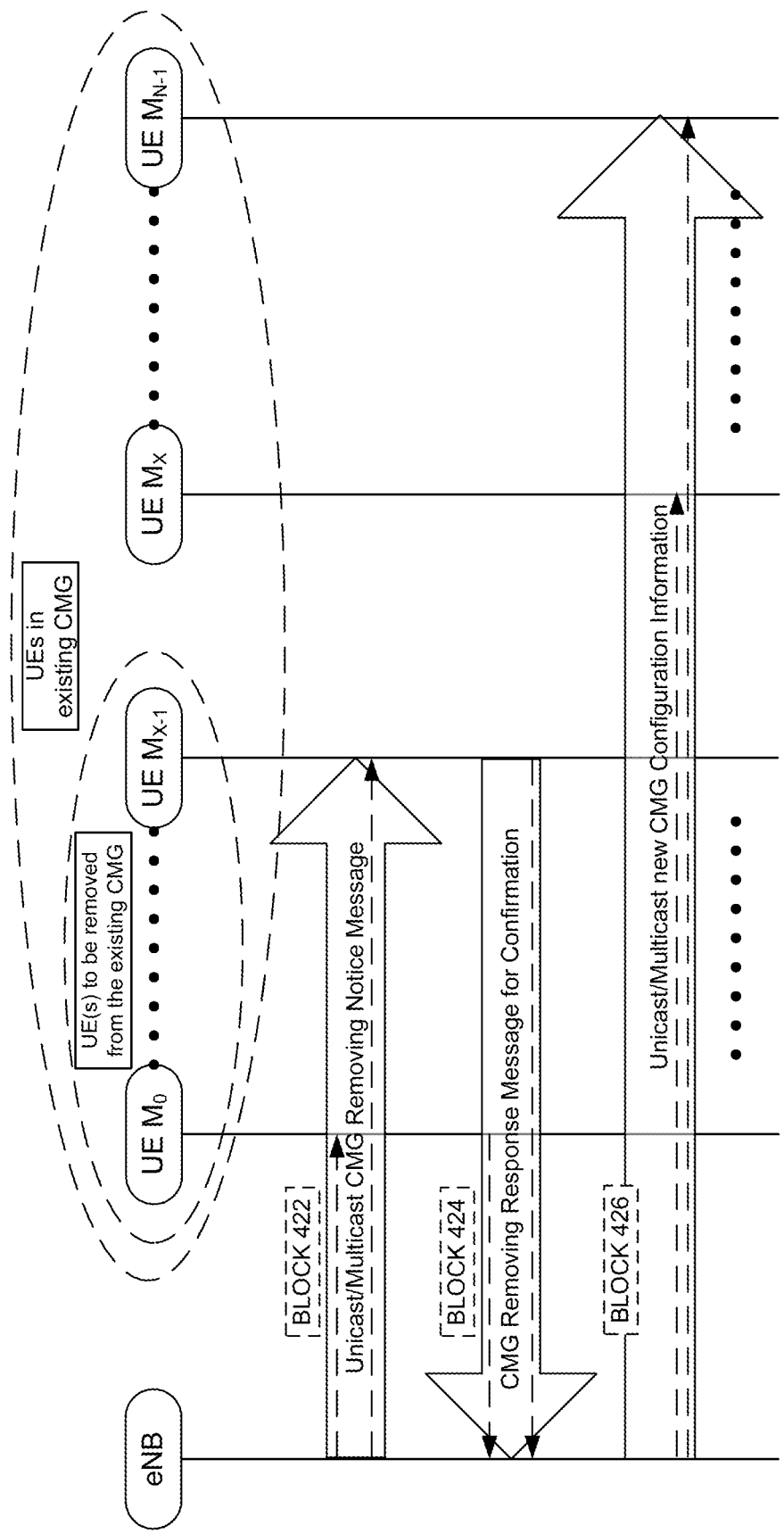
FIG. 26 illustrates an example process for removing UE(s) from a channel measurement group (CMG) in accordance with an example.

FIG. 26 illustrates the procedure for removing UE(s) from the CMG. For example, the eNB can send a unicast or multicast CMG removing request message (BLOCK 422), such as a "CMGRemovingRequest" message (illustrated in FIG. 27) to the candidates UE for the existing CMG group. The CMGRemovingRequest field descriptions can include a cmgID or cmgReponseDurationTimer. The cmgID can indicate the identity for CMG to be removed for candidate UE. The cmgReponseDurationTimer can indicate the timer length for the UE response message received.

After the candidate UEs receive the CMGRemovingRequest message (FIG. 27) from the eNB, each candidate UE can reply with a CMG removing response message for confirmation (BLOCK 424 in FIG. 26), such as a "CMGRemoveResponse" message (illustrated in FIG. 28) back to eNB. The CMGRemoveResponse field descriptions can include cmgID. The cmgID can indicate the identity for CMG to be removed for candidate UE. After sending the CMGRemoveResponse message, the UE(s) can stop all operations related to the CMG.

After the eNB received the confirmation CMGRemoveResponse messages (FIG. 28) from the candidate UEs, then the eNB can update the new UE list in the CMG, by sending a CMG configuration message (BLOCK 426 in FIG. 26), such as the CMGConfigUpdate (illustrated in FIG. 23) that can include information to support CMG related operations.

Operations Supported by the Channel Measurement Group

After definitions of a CMG related procedure, an operation supported by CMG can be a D2D channel status information measurement and reporting to the eNB for device-to-device channels. In an example, the SRS with configuration information included in the IE "uePhysicalConfigDedicated" can be used for channel measurement for D2D links. The measurement and report of channel status information can include a received SRS signal strength (e.g., a reference signal received power (RSRP) measured as dBm and/or reference signal received quality (RSRQ) measured as dB). Other channel information may be included in the channel status information report by extending the message format directly.

Figure 29:
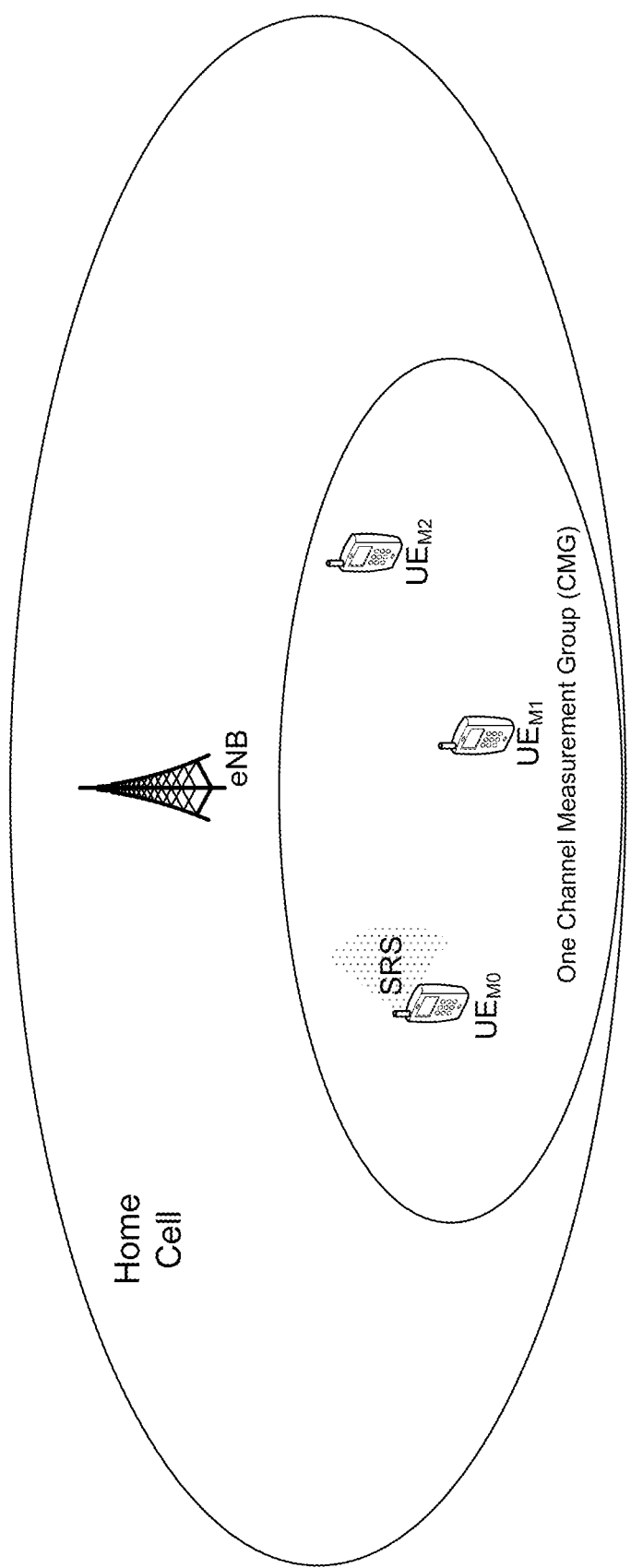
FIG. 29 illustrates a diagram of device-to-device (D2D) channel measurement using a channel measurement group (CMG) in accordance with an example.

FIG. 29 illustrates a simple example of a D2D channel measurement using one CMG. For example, the $UE_{M0}$ can send a SRS signal. The $UE_{M0}$'s configuration information can be known by the $UE_{M1}$, $UE_{M2}$, and eNB. Both the $UE_{M1}$ and $UE_{M2}$ can measure the received SRS signal sent from $UE_{M0}$, then the received signal information can be collected and reported to eNB periodically. Based on the information, for example, eNB can calculate the pathloss from $UE_{M0}$ to $UE_{M1}$ by considering the strength of the received signal (R0,1 [dBm]) and the transmission power of $UE_{M0}$ ($P_0$[dBm]). For simplicity, the channels from $UE_{M0}$ to $UE_{M1}$ and from $UE_{M1}$ to $UE_{M0}$ can be considered to be symmetric, and the pathloss between $UE_{M0}$ and $UE_{M1}$ can be defined as $g_{0,1}$, which can be given by:

$$g_{0,1}[dB]=R_{0,1}-P_0.$$

Figure 30:
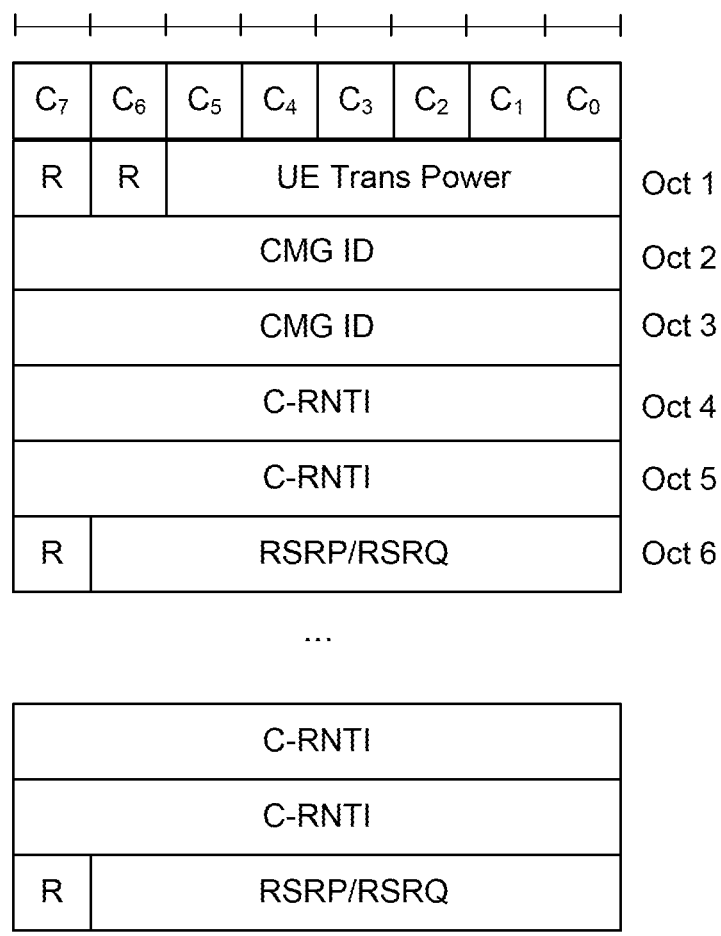
FIG. 30 illustrates a diagram of a media access control (MAC) information element (IE) for received sounding reference signal (SRS) signal strength reporting in accordance with an example.

The reporting of measurement channel information, such as channel pathloss, may use at least two alternative solutions, such as a media access control (MAC) control IE or a RRC message. FIG. 30 illustrates a MAC control IE for RSRP/ RSRQ reporting. The MAC control IE can include a UE transmission power CMG ID, C-RNTI, RSRP and/or RSRQ, using configuration bits (e.g., C0 to C7) in an octal grouping (e.g., oct 1 to oct 6), where "R" represents a reserve bit. In an example, the MAC control IE can use a reporting range for RSRP defined from −140 dBm to 22 with a 1.5 dB resolution, as shown in Table 2. Table 2 illustrates an example of reference signal received power (RSRP) measurement report mapping of the measured quantity. The reported RSRP value can be represented by 6 configuration bits (e.g., $2^6$=up to 128 values). In an example, the range in the signaling may be larger than a guaranteed accuracy range.

TABLE 2

| Reported value | Measured quantity value (per RE) | Unit |
|---|---|---|
| RSRP_00 | RSRP < −140 | dBm |
| RSRP_01 | −140 ≤ RSRP < −138.5 | dBm |
| RSRP_02 | −138.5 ≤ RSRP < −137 | dBm |
| ... | ... | ... |
| RSRP_106 | 17.5 ≤ RSRP < 19 | dBm |
| RSRP_107 | 19 ≤ RSRP < 20.5 | dBm |
| RSRP_108 | 20.5 ≤ RSRP < 22 | dBm |

The number of resource elements within a considered measurement frequency bandwidth and within a measurement period that can be used by the UE to determine RSRP can be determined by the UE implementation, as long as the corresponding measurement accuracy requirements are met.

In another example, the MAC control IE can use a reporting range for RSRQ defined from −19.5 dB to −3 dB with a 0.25 dB resolution, as shown in Table 3. Table 3 illustrates an example of reference signal received quality (RSRQ) measurement report mapping of measured quantity. In an example, the range in the signaling may be larger than a guaranteed accuracy range.

TABLE 3

| Reported value | Measured quantity value | Unit |
|---|---|---|
| RSRQ_00 | RSRQ < −19.5 | dB |
| RSRQ_01 | −19.5 ≤ RSRQ < −19.25 | dB |
| RSRQ_02 | −19.25 ≤ RSRQ < −19 | dB |
| ... | ... | ... |
| RSRQ_64 | −3.5 ≤ RSRQ < −3.25 | dB |
| RSRQ_65 | −3.25 ≤ RSRQ < −3 | dB |
| RSRQ_67 | −3 ≤ RSRQ | dB |

FIG. 31 illustrates a RRC message for RSRP/RSRQ reporting, such as a D2D-MeasReport message. The D2D-MeasReport field descriptions can include cmgID, srsMeasResults, srsTransUE, rsrpResult, rsrqResult, or ueTransPower. The cmgID can indicate the identity of CMG. The srsMeasResults can indicate the SRS measurement results which will be reported to eNB. The srsTransUE can indicate the C-RNTI of UE that transmits the SRS. The rsrpResult can indicate the RSRP measurement results. The rsrqResult can indicate the RSRQ measurement results. The ueTransPower can indicate the SRS transmission power of the UE.

Figure 32:
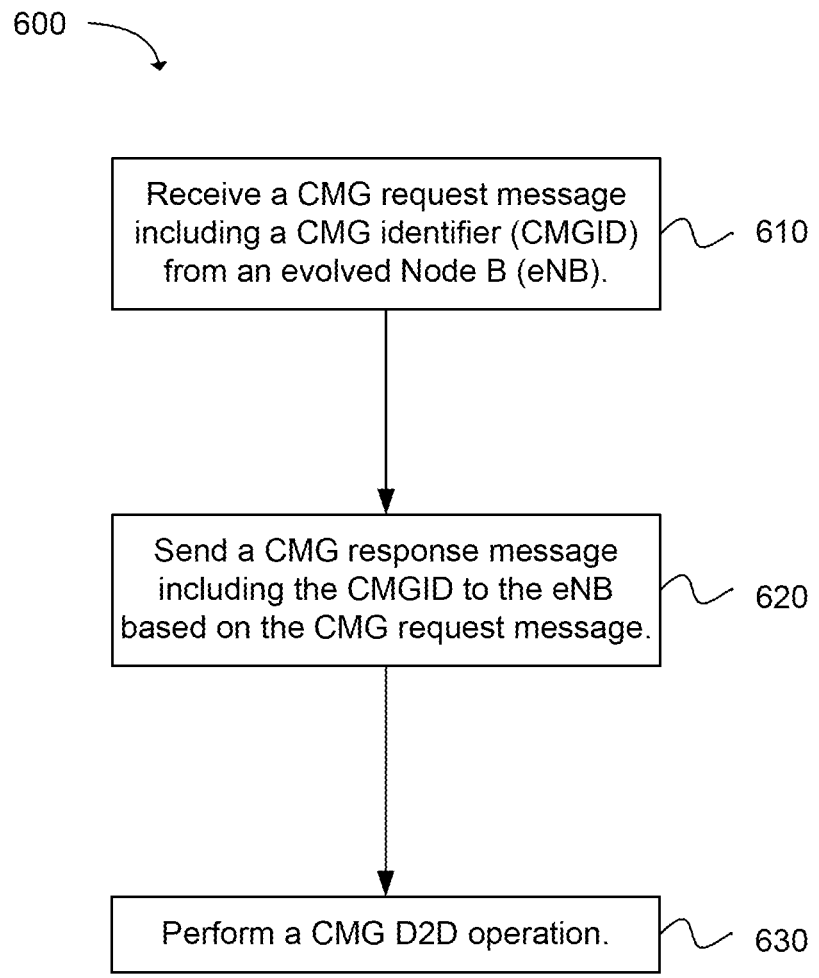
FIG. 32 depicts a flow chart of a method for using a channel measurement group (CMG) for a device discovery device-to-device (D2D) operation in accordance with an example.

Another example provides a method 600 for using a channel measurement group (CMG) for a device discovery device-to-device (D2D) operation, as shown in the flow chart in FIG. 32. The method may be executed as instructions on a machine or computer circuitry, where the instructions are included on at least one computer readable medium or one non-transitory machine readable storage medium. A user equipment (UE) in a channel measurement group (CMG) operable for device discovery using a device-to-device (D2D) sounding reference signal (SRS) can have computer circuitry to perform the method 600. The computer circuitry can be configured to receive a CMG request message including a CMG identifier (CMGID) from an evolved Node B (eNB), as in block 610. The computer circuitry can be further configured to send a CMG response message including the CMGID to the eNB based on the CMG request message, as in block 620. The computer circuitry can also be configured to perform a CMG D2D operation, as in block 630.

In an example, the computer circuitry configured to perform the CMG D2D can be further configured to: Receive D2D SRS configuration information for the CMG from the eNB; measure a signal strength or a signal quality of a D2D SRS based on the D2D SRS configuration information; generate a channel status report for a D2D link between a UE pair based on a measurement of the D2D SRS, where the UE pair includes the UE and another UE in the CMG; and send the channel status report to the eNB. The channel status report can uses a medium access control (MAC) information element (IE) or a radio resource control (RRC) information element (IE). The MAC IE can include a UE transmission power of the SRS, a CMG identifier (ID), a measurement range of the SRS, or cell radio network temporary identifier (C-RNTI) for the UE that transmits the SRS. The RRC IE can include a SRS transmission power, a CMG identifier (ID), a sounding reference signal received power (RSRP) measurement range of the SRS, a sounding reference signal received quality (RSRQ) measurement range of the SRS, or C-RNTI for the UE that transmits the SRS.

In another example, the CMG request message can include a new CMG creating request message to create a new CMG, and the CMG response message can include a new CMG creating response message indicating whether the UE has capability to support CMG operations, and the CMG D2D operation can include the receiving D2D SRS configuration information for the CMG from the eNB.

In another configuration, the CMG request message can include a CMG joining request message to add the UE to an existing CMG, and the CMG response message can include a CMG joining response message indicating whether the UE has capacity to support CMG operations, and the CMG D2D operation can include receiving updated D2D SRS configuration information for the CMG from the eNB.

In another example, the CMG request message can include a CMG removing request message to remove the UE from the CMG, and the CMG response message can include a CMG removing response message indicating the UE has received the CMG removing request message, and the CMG D2D operation can include ceasing operations related to the CMG.

In another configuration, the CMG request message can include a CMG response duration timer value to receive a response, and the CMG D2D operation can include receiving D2D SRS configuration information for the CMG including CMG information, such as a list of cell radio network temporary identifiers (C-RNTIs) for UEs in the CMGs, a UE specific channel configuration, a measurement report interval, or a measurement report type.

Referring back to FIG. 16, the node 710 or the node device 712 can be configured for device discovery using a device-to-device (D2D) sounding reference signal (SRS) in a channel measurement group (CMG) including a plurality of user equipments (UEs). The processing module 714 can be configured to: Generate a CMG identifier (CMGID) for a CMG, and determine a UE pair available for D2D communication by calculating a channel pathloss in a D2D link between the UE pair from a channel status report. The transceiver module 716 can be configured to: Transmit D2D SRS configuration information to the UEs in the CMG to measure a D2D SRS, and receive the channel status report based on measurements of a D2D SRS.

In an example, the measurements of the D2D SRS can include a sounding reference signal received power (RSRP) or a sounding reference signal received quality (RSRQ). The channel status report can use a medium access control (MAC) information element (IE) or a radio resource control (RRC) information element (IE). The MAC IE can include a UE transmission power of the SRS, a CMG identifier (ID), a measurement range, or cell radio network temporary identifier (C-RNTI) for the UE that transmits the SRS. The RRC IE can include a SRS transmission power, a CMG identifier (ID), a sounding reference signal received power (RSRP) measurement range, a sounding reference signal received quality (RSRQ) measurement range, or C-RNTI for the UE that transmits the SRS.

In another example, the transceiver module 716 can be further configured to: Send a new CMG creating request message including a CMGID and a CMG response duration timer value to receive a response, and receive a new CMG creating response message including a CMGID and a CMG execute allowed Boolean value. The D2D SRS configuration information can includes a list of UE cell radio network temporary identifiers (C-RNTIs) in the CMGs, a UE specific channel configuration, a measurement report interval, or a measurement report type.

In another configuration, the transceiver module 716 is further configured to: Send a CMG joining request message including a CMGID to be added to the UE, a CMG response duration timer value to receive a response, and a count of UEs in the CMG, and receive a CMG joining response message including the CMGID and a CMG execute allowed value. The processing module 714 is further configured to: Add a UE to the CMG with an affirmative CMG joining response message.

In another example, the transceiver module 716 is further configured to: Send a CMG removing request message including a CMGID to be removed for the UE and a CMG response duration timer value to receive a response, and receive a CMG removing response message including the CMGID. The processing module 714 is further configured to: Stop operations related to the CMG when a CMG removing response message is received.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) configured for device discovery via a node using a device-to-device (D2D) sounding reference signal (SRS), the UE comprising:
   one or more antennas; and
   a transceiver module configured to:
      send a radio resource control (RRC) device discovery request to a node via the one or more antennas,
      scan D2D SRS subframes of proximity UEs using D2D SRS triggering, wherein a proximity UE is located within a same cell as the UE, and
      send feedback to the node of detected D2D SRS information of the proximity UEs via the one or more antennas, wherein the transceiver module comprises code that is located in one or more digital memory devices to be executed by one or more processors or the transceiver module is implemented in a hardware circuit.

2. The UE of claim 1, wherein the transceiver module is further configured to receive configured SRS resource information of proximity UEs from the node before a scan of D2D SRS subframes of proximity UEs.

3. The UE of claim 2, wherein the configured SRS resources information includes a radio resource control (RRC) information element (IE) D2D-Detectable-SoundingRS-UL-ConfigDedicatedList that includes information selected from the group consisting of a frequency domain position, a SRS configuration index, a transmission comb, a cyclic shift (CS), a detectable SRS index, a bandwidth for D2D SRS transmission for a cell, a frequency hopping bandwidth for a D2D SRS transmission, and combinations thereof.

4. The UE of claim 1, wherein the detected D2D SRS information includes a feedback information element (IE) SRSDetectedReport that includes information selected from the group consisting of a frequency domain position, time domain position, a transmission comb, a cyclic shift (CS), and combinations thereof.

5. The UE of claim 1, wherein the transceiver module is further configured to transmit D2D SRS subframes to proximity UEs based on downlink control information (DCI) for D2D SRS triggering from the node, wherein a DCI format size for the DCI is extended to a same size as a legacy DCI by adding padding bits.

6. The UE of claim 1, wherein the transceiver module is further configured to trigger an aperiodic D2D SRS transmission for a group of D2D UEs based on a group-specific discovery radio network temporary identifier (D-RNTI) and an exclusive group index of the UE included in downlink control information (DCI), wherein a DCI format for the DCI is scrambled with the group-specific D-RNTI, and each D2D UE in the group is allocated an exclusive group index to uniquely identify each D2D UE using the D-RNTI.

7. The UE of claim 1, wherein the D2D SRS triggering further comprises triggering a D2D SRS transmission by a downlink control information (DCI) with CRC scrambled by discovery radio network temporary identifier (D-RNTI) based on location information of the UEs in proximity to each other and a group index provided by higher layer signaling that determines the index to the D2D SRS triggering for the UE sharing the same D-RNTI with other UEs.

8. The UE of claim 7, further comprising:
   a processing circuit configured to:
      detect the DCI for D2D SRS triggering by monitoring a set of physical downlink control channel (PDCCH) candidates in a device-specific search space, wherein the device-specific search space is determined by the D-RNTI or in a common search space (CSS) in each downlink subframe.

9. The UE of claim 1, wherein the D2D SRS triggering uses aperiodic D2D SRS triggering using a specified set of cell radio network temporary identifiers (C-RNTIs) based on location information of the UEs in proximity to each other, wherein transceiver module is further configured to scan a D2D SRS transmitted from a specified C-RNTI in the specified set.

10. The UE of claim 1, wherein the UE includes at least one of an antenna configured to communicate with the node, a touch sensitive display screen that can receive touch input to the UE, a speaker that can be used for audio output from the UE, a microphone that can be used for audio input to the UE, a graphics processor that provides display capabilities for the UE, an application processor that provides processing capabilities to the UE, internal memory that provides memory capability for the UE, a non-volatile memory port that provides data input/output options for the UE, and combinations thereof, and the node is selected from the group consisting of a base station (BS), a Node B (NB), an evolved Node B (eNB), a baseband unit (BBU), a remote radio head (RRH), a remote radio equipment (RRE), a remote radio unit (RRU), and combinations thereof.

11. A method for device discovery using a device-to-device (D2D) sounding reference signal (SRS), the method comprising:
   receiving D2D SRS configuration information from an evolved Node B (eNB) at a user equipment (UE);
   sending UE capability information to the eNB;
   receiving D2D SRS resources allocation information from the eNB;
   scanning configured D2D SRS resources at the UE based on the D2D SRS resources allocation information; and
   sending feedback of detected D2D SRS resources to the eNB.

12. The method of claim 11, wherein scanning the configured D2D SRS resources includes scanning D2D SRS resources at each cell-specific D2D SRS opportunity, wherein a periodicity and index of subframes for D2D SRS is derived from a cell-specific subframe offset for the transmission of D2D SRS or an upper limit of a cell-specific subframe configuration period to avoid a physical uplink shared channel (PUSCH) interference.

13. The method of claim 11, wherein D2D SRS configuration information includes a cell-specific periodic D2D SRS periodicity at least two times greater than a cell-specific SRS periodicity.

14. The method of claim 11, further comprising transmitting a D2D SRS on fixed frequency domain resources, wherein frequency hopping on the D2D SRS is disabled.

15. The method of claim 11, wherein:
receiving the D2D SRS resources allocation information further comprises:
receiving via radio resource control (RRC) signaling a D2D SRS muting pattern including one selected SRS transmission opportunity to be muted in a repeated pattern of multiple consecutive UE-specific periodic D2D SRS transmissions in a D2D subframe while the remaining periodic D2D SRS transmissions are transmitted, wherein each co-located D2D UE uses a different SRS transmission opportunity in the time-domain; and
further comprising:
transmitting a D2D SRS on the SRS transmission opportunity allocated to the UE.

16. The method of claim 11, wherein:
scanning the configured D2D SRS resources further comprises:
implicitly generating a D2D SRS muting pattern including one selected SRS transmission opportunity to be muted in a repeated pattern of multiple consecutive UE-specific periodic D2D SRS transmission in a D2D subframe while the remaining periodic D2D SRS transmissions are transmitted, wherein muted SRS transmissions in the time-domain for each co-located D2D UE is implicitly generated using a pseudo-random sequence initialized by a UE identity, and the pseudo-random sequence is based on a D2D SRS muting pattern periodicity and periodicity index; and
further comprising:
transmitting a D2D SRS on the SRS transmission opportunity allocated to the UE.

17. The method of claim 11, wherein:
receiving the D2D SRS resources allocation information further comprises:
receiving via a system information block (SIB) a transmission power for a D2D SRS; and
further comprising:
transmitting a D2D SRS with the transmission power.

18. The method of claim 11, wherein:
receiving the D2D SRS resources allocation information further comprises:
receiving a D2D SRS bandwidth for the D2D SRS; and
further comprising:
implicitly determining a D2D SRS transmission power based on the D2D SRS bandwidth, wherein a one-to-one mapping exists between the D2D SRS bandwidth and the D2D SRS transmission power; and
transmitting a D2D SRS with the D2D SRS transmission power.

19. The method of claim 11, wherein a D2D SRS bandwidth for the configured D2D SRS resources uses a single physical resource block (PRB).

20. The method of claim 11, wherein receiving the D2D SRS configuration information includes receiving UE-specific periodic SRS configuration information via radio resource control (RRC) signaling, wherein the UE-specific periodic SRS configuration information includes a cyclic shift value, a frequency domain location, a transmission comb, a subframe index, and a periodicity.

21. The method of claim 11, wherein:
receiving D2D SRS resources allocation information further comprises receiving via dedicated radio resource control (RRC) signaling a limited number of UE specific D2D SRS resources to be detected for a specified number of UEs; and
scanning the configured D2D SRS resources further comprises scanning the limited number of UE specific D2D SRS resources.

22. The method of claim 11, wherein the D2D SRS configuration information is selected from the group consisting of a bandwidth for D2D SRS transmission for a cell, a bandwidth for a single D2D SRS transmission and reception, cell-specific D2D SRS resources periodicity, cell-specific D2D SRS resources offset value, cell-specific D2D SRS resources configuration in a comb domain, cell-specific D2D SRS resources configuration in a cyclic shift (CS) domain, a transmission power for the D2D SRS, and combinations thereof.

23. The method of claim 11, wherein the D2D SRS resources allocation information is selected from the group consisting of configurable parameters for a periodic D2D SRS transmission, configurable parameters for an aperiodic D2D SRS transmission, a frequency domain position, an SRS configuration index, a transmission comb, a cyclic shift (CS), an SRS muting configuration index, a discovery radio network temporary identifier (D-RNTI), a group index of the UE sharing the D-RNTI, a cell radio network temporary identifier (C-RNTI), a specified set number of C-RNTI for D2D UEs in proximity to each other, a detectable SRS index, a bandwidth for D2D SRS transmission for a cell, a frequency hopping bandwidth for a D2D SRS transmission, and combinations thereof.

24. The method of claim 11, wherein the feedback of the detected D2D SRS resources is selected from the group consisting of a frequency domain position, time domain position, a transmission comb, a cyclic shift (CS), and combinations thereof.

25. The method of claim 11, wherein scanning the configured D2D SRS resources uses a D2D SRS muting pattern based on a muting offset and a muting periodicity configured via radio resource control (RRC) signaling, and the muting offset and the muting periodicity determine a D2D SRS opportunity to scan.

26. The method of claim 11, wherein scanning the configured D2D SRS resources uses an implicit pseudo-random sequence based on a periodicity, periodicity index, and UE identity to determine a D2D SRS opportunity to scan.

27. The method of claim 11, wherein receiving D2D SRS configuration information uses a system information block (SIB), and sending UE capability information and receiving D2D SRS resources allocation information uses radio resource control (RRC) signaling.

28. At least one non-transitory machine readable storage medium storing a plurality of computer executable instructions which when executed by one or more processors perform the following:
receiving D2D SRS configuration information from an evolved Node B (eNB) at a user equipment (UE);
sending UE capability information to the eNB;
receiving D2D SRS resources allocation information from the eNB;
scanning configured D2D SRS resources at the UE based on the D2D SRS resources allocation information; and
sending feedback of detected D2D SRS resources to the eNB.

29. A user equipment (UE) in a channel measurement group (CMG) operable for device discovery using a device-to-device (D2D) sounding reference signal (SRS), the UE comprising:

one or more antennas;
a transceiver module configured to:
receive a CMG request message including a CMG identifier (CMGID) from an evolved Node B (eNB) via the one or more antennas, and
send a CMG response message including the CMGID to the eNB based on the CMG request message via the one or more antennas, wherein the transceiver module comprises code that is located in one or more digital memory devices to be executed by one or more processors or the transceiver module is implemented in a first hardware circuit; and
a processing module configured to:
receive D2D SRS configuration information for the CMG from the eNB via the one or more antennas;
measure a signal strength or a signal quality of a D2D SRS based on the D2D SRS configuration information;
generate a channel status report for a D2D link between a UE pair based on a measurement of the D2D SRS, wherein the UE pair includes the UE and another UE in the CMG; and
send the channel status report to the eNB via the one or more antennas, wherein the processing module comprises code that is located in the one or more digital memory devices to be executed by the one or more processors or the processing module is implemented in a second hardware circuit.

30. The UE of claim 29, wherein the channel status report uses a medium access control (MAC) information element (IE) or a radio resource control (RRC) information element (IE); wherein the MAC IE includes information selected from the group consisting of a UE transmission power of the SRS, a CMG identifier (ID), a measurement range of the SRS, cell radio network temporary identifier (C-RNTI) for the UE that transmits the SRS, and combinations thereof and wherein the RRC IE includes information selected from the group consisting of a SRS transmission power, a CMG identifier (ID), a sounding reference signal received power (RSRP) measurement range of the SRS, a sounding reference signal received quality (RSRQ) measurement range of the SRS, C-RNTI for the UE that transmits the SRS, and combinations thereof.

31. The UE of claim 29, wherein the CMG request message includes a new CMG creating request message to create a new CMG, and the CMG response message includes a new CMG creating response message indicating whether the UE has capability to support CMG operations, and the CMG D2D operation includes receiving D2D SRS configuration information for the CMG from the eNB.

32. The UE of claim 29, wherein the CMG request message includes a CMG joining request message to add the UE to an existing CMG, and the CMG response message includes a CMG joining response message indicating whether the UE has capacity to support CMG operations, and the CMG D2D operation includes receiving updated D2D SRS configuration information for the CMG from the eNB.

33. The UE of claim 29, wherein the CMG request message includes a CMG removing request message to remove the UE from the CMG, and the CMG response message includes a CMG removing response message indicating the UE has received the CMG removing request message, and the CMG D2D operation includes ceasing operations related to the CMG.

34. The UE of claim 29, wherein the CMG request message includes a CMG response duration timer value to receive a response, and the CMG D2D operation includes receiving D2D SRS configuration information for the CMG including CMG information selected from the group consisting of a list of cell radio network temporary identifiers (C-RNTIs) for UEs in the CMGs, a UE specific channel configuration, a measurement report interval, a measurement report type, and combinations thereof.

35. A node for device discovery using a device-to-device (D2D) sounding reference signal (SRS) in a channel measurement group (CMG) including a plurality of user equipments (UEs), the node comprising:
one or more antennas;
a processing module configured to:
generate a CMG identifier (CMGID) for a CMG, and
determine a UE pair available for D2D communication by calculating a channel pathloss in a D2D link between the UE pair from a channel status report, wherein the processing module comprises code that is located in one or more digital memory devices to be executed by one or more processors or the processing module is implemented in a first hardware circuit; and
a transceiver module configured to:
transmit D2D SRS configuration information to the UEs in the CMG via the one or more antennas to measure a D2D SRS, and
receive the channel status report via the one or more antennas based on measurements of a D2D SRS, wherein the transceiver module comprises code that is located in the one or more digital memory devices to be executed by the one or more processors or the transceiver module is implemented in a second hardware circuit.

36. The node of claim 35, wherein the measurements of the D2D SRS include a sounding reference signal received power (RSRP) or a sounding reference signal received quality (RSRQ).

37. The node of claim 35, wherein the channel status report uses a medium access control (MAC) information element (IE) or a radio resource control (RRC) information element (IE); wherein the MAC IE includes information selected from the group consisting of a UE transmission power of the SRS, a CMG identifier (ID), a measurement range, cell radio network temporary identifier (C-RNTI) for the UE that transmits the SRS, and combinations thereof; and wherein the RRC IE includes information selected from the group consisting of a SRS transmission power, a CMG identifier (ID), a sounding reference signal received power (RSRP) measurement range, a sounding reference signal received quality (RSRQ) measurement range, C-RNTI for the UE that transmits the SRS, and combinations thereof.

38. The node of claim 35, wherein:
the transceiver module is further configured to:
send a new CMG creating request message including a CMGID and a CMG response duration timer value to receive a response via the one or more antennas, and
receive a new CMG creating response message including a CMGID and a CMG execute allowed Boolean value via the one or more antennas; and
wherein the D2D SRS configuration information includes a list of UE cell radio network temporary identifiers (C-RNTIs) in the CMGs, a UE specific channel configuration, a measurement report interval, or a measurement report type.

39. The node of claim 35, wherein:
the transceiver module is further configured to:
send a CMG joining request message including a CMGID to be added to the UE via the one or more antennas, a CMG response duration timer value to receive a response, and a count of UEs in the CMG, and receive a CMG joining response message including the CMGID and a CMG execute allowed value via the one or more antennas; and the processing module is further configured to:

add a UE to the CMG with an affirmative CMG joining response message.

40. The node of claim 35, wherein:

the transceiver module is further configured to:

send a CMG removing request message including a CMGID to be removed for the UE and a CMG response duration timer value to receive a response via the one or more antennas, and receive a CMG removing response message including the CMGID via the one or more antennas; and the processing module is further configured to:

stop operations related to the CMG when a CMG removing response message is received.

41. The node of claim 35, wherein at least one of the UEs in the channel measurement group (CMG) includes at least one of an antenna configured to communicate with the node, a touch sensitive display screen that can receive touch input to the UE, a speaker that can be used for audio output from the UE, a microphone that can be used for audio input to the UE, a graphics processor that provides display capabilities for the UE, an application processor that provides processing capabilities to the UE, internal memory that provides memory capability for the UE, a non-volatile memory port that provides data input/output options for the UE, and combinations thereof, and the node is selected from the group consisting of a base station (BS), a Node B (NB), an evolved Node B (eNB), a baseband unit (BBU), a remote radio head (RRH), a remote radio equipment (RRE), a remote radio unit (RRU), and combinations thereof.

* * * * *